US012611013B2

(12) United States Patent
Reginelli et al.

(10) Patent No.: US 12,611,013 B2
(45) Date of Patent: *Apr. 28, 2026

(54) DEVICE COMPRISING DECORATIVE OBJECTS HAVING RESTRAINED FREEDOM TO MOVE AND SUSPENDED IN FLUID

(71) Applicant: Preciflex SA, Neuchâtel (CH)

(72) Inventors: Sandro Reginelli, La Neuveville (CH); Toralf Bork, Enges (CH); Jean Gubelmann, Yverdon-les-Bains (CH); Johann Rohner, Pomy (CH); Mathieu Oulevey, Lausanne (CH); Alain Jaccard, Sainte-Croix (CH); Luc Maffli, Fribourg (CH)

(73) Assignee: Preciflex SA, Neuchâtel (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/384,472

(22) Filed: Oct. 27, 2023

(65) Prior Publication Data

US 2024/0156220 A1 May 16, 2024

Related U.S. Application Data

(63) Continuation of application No. 17/281,653, filed as application No. PCT/IB2019/058385 on Oct. 2, 2019, now Pat. No. 11,849,817.

(60) Provisional application No. 62/854,997, filed on May 31, 2019, provisional application No. 62/828,672, filed on Apr. 3, 2019, provisional application No. 62/740,251, filed on Oct. 2, 2018.

(51) Int. Cl.
*A44C 25/00* (2006.01)
*G04B 45/00* (2006.01)

(52) U.S. Cl.
CPC .......... *A44C 25/00* (2013.01); *G04B 45/0023* (2013.01)

(58) Field of Classification Search
CPC ... A44C 17/02; A44C 17/0241; A44C 17/025; A44C 17/0258; A44C 17/0275; A44C 17/0283; A44C 17/0291; G04B 45/0023; G04B 45/00
See application file for complete search history.

(56) References Cited

U.S. PATENT DOCUMENTS 3,271,897 A 9/1966 Gelinas
3,650,056 A 3/1972 Walton
3,652,949 A 3/1972 Szabo
4,142,383 A 3/1979 Eberhart
4,196,535 A 4/1980 Heimo
4,469,447 A 9/1984 Chatten
4,568,618 A 2/1986 Uchishiba et al.
(Continued)

FOREIGN PATENT DOCUMENTS

CH 0649697 A5 * 12/1982
CH 712113 A1 8/2017
(Continued)

*Primary Examiner* — Jack W Lavinder
(74) *Attorney, Agent, or Firm* — Da Vinci Partners LLC; John Brent Moetteli

(57) ABSTRACT

A decorative, wearable system includes at least one decorative element mechanically and moveably suspended in a liquid by mechanical fixation elements. The liquid shares a substantially similar refraction index as at least one of mechanical fixation elements.

20 Claims, 23 Drawing Sheets

(56) References Cited

U.S. PATENT DOCUMENTS

| | | | | | |
|---|---|---|---|---|---|
| 4,578,044 | A | | 3/1986 | Saitoh | |
| 4,939,859 | A | * | 7/1990 | Bradt | A63H 23/08 40/406 |
| 5,050,876 | A | | 9/1991 | Chuang | |
| 5,272,681 | A | | 12/1993 | Lee | |
| 5,292,564 | A | | 3/1994 | Lee | |
| 5,483,764 | A | | 1/1996 | Lin | |
| 5,619,816 | A | | 4/1997 | Ellison | |
| 5,652,736 | A | | 7/1997 | Lee | |
| 6,052,338 | A | | 4/2000 | Shevins | |
| 6,226,232 | B1 | * | 5/2001 | Ruchonnet | G02C 11/02 63/31 |
| 6,244,772 | B1 | * | 6/2001 | Ruchonnet | B43K 5/005 401/52 |
| 6,248,110 | B1 | | 6/2001 | Reiley et al. | |
| 6,324,868 | B1 | | 12/2001 | Chen et al. | |
| 6,324,869 | B1 | * | 12/2001 | Vanlioglu | A44C 17/0291 63/26 |
| 6,416,217 | B1 | | 7/2002 | Von Braunhut | |
| 6,697,303 | B2 | | 2/2004 | Amano et al. | |
| 6,766,658 | B2 | | 7/2004 | Scharf | |
| 7,616,528 | B2 | | 11/2009 | Meadows | |
| 8,593,911 | B2 | | 11/2013 | Grize et al. | |
| 8,869,558 | B2 | | 10/2014 | Yamamoto et al. | |
| 8,986,308 | B2 | | 3/2015 | Philippon et al. | |
| 8,995,237 | B2 | | 3/2015 | Vouillamoz | |
| 9,220,545 | B2 | | 12/2015 | Philippon et al. | |
| 9,851,694 | B2 | | 12/2017 | Fladl | |
| 9,931,214 | B2 | | 4/2018 | Philippon et al. | |
| 10,362,844 | B2 | | 7/2019 | Bove et al. | |
| 10,709,663 | B2 | | 7/2020 | Dhuppad et al. | |
| 11,454,935 | B2 | | 9/2022 | Tortora | |
| 2004/0230193 | A1 | | 11/2004 | Cheung | |
| 2005/0203508 | A1 | | 9/2005 | Thelen et al. | |
| 2007/0234757 | A1 | | 10/2007 | Sherman | |
| 2009/0084936 | A1 | | 4/2009 | Ono et al. | |
| 2009/0266305 | A1 | * | 10/2009 | Pavlowski | A01K 63/006 29/527.1 |
| 2011/0068243 | A1 | | 3/2011 | Asscher et al. | |
| 2013/0240135 | A1 | | 9/2013 | Gratzer | |
| 2013/0276479 | A1 | * | 10/2013 | Noyes | A44C 17/0283 29/896.41 |
| 2017/0146956 | A1 | | 5/2017 | Vouillamoz | |
| 2018/0095953 | A1 | | 4/2018 | Mayer et al. | |
| 2018/0325680 | A1 | | 11/2018 | Philippon et al. | |
| 2019/0041800 | A1 | | 2/2019 | Husson et al. | |
| 2019/0137935 | A1 | | 5/2019 | Peters et al. | |
| 2020/0117145 | A1 | | 4/2020 | Monferrer | |

FOREIGN PATENT DOCUMENTS

| | | | | | |
|---|---|---|---|---|---|
| CN | 2153823 | Y | | 1/1994 | |
| CN | 2215123 | Y | | 12/1995 | |
| CN | 1503085 | | | 6/2004 | |
| CN | 1504846 | A | | 6/2004 | |
| CN | 1503087 | A | | 8/2004 | |
| CN | 101238923 | A | | 3/2008 | |
| CN | 201370347 | Y | | 12/2009 | |
| CN | 201587264 | U | | 9/2010 | |
| CN | 204374621 | U | | 8/2015 | |
| CN | 105143926 | A | | 12/2016 | |
| CN | 106716265 | A | | 5/2017 | |
| CN | 106796415 | A | | 5/2017 | |
| CN | 108348052 | A | | 7/2018 | |
| CN | 106778774 | A | | 11/2018 | |
| CN | 109862804 | | | 6/2019 | |
| DE | 102011055035 | A1 | * | 5/2013 | A44C 17/0283 |
| EP | 1843226 | A1 | | 10/2007 | |
| EP | 1864841 | A1 | | 2/2008 | |
| EP | 2230574 | A1 | | 9/2010 | |
| EP | 3620885 | A1 | | 2/2021 | |
| FR | 1022253 | A | | 3/1953 | |
| FR | 1043243 | A | | 11/1953 | |
| FR | 2679052 | A | | 1/1993 | |
| GB | 2235793 | A | | 3/1991 | |
| GB | 2258601 | A | * | 2/1993 | A44C 17/02 |
| GB | 2347237 | A | | 8/2000 | |
| JP | S5821497 | | | 2/1983 | |
| JP | S6266509 | U | | 4/1987 | |
| JP | 2005537523 | A | | 12/2005 | |
| JP | 3135480 | U | | 5/2007 | |
| JP | 2008194958 | A | | 8/2008 | |
| JP | 2009085758 | A | | 4/2009 | |
| JP | 201050143 | A | | 2/2010 | |
| JP | 2012130634 | A | | 7/2012 | |
| JP | 2017113062 | A | | 6/2017 | |
| JP | 2017138169 | A | | 8/2017 | |
| JP | 2019610966 | A | | 4/2018 | |
| JP | 2018134196 | A | | 8/2018 | |
| JP | 2019629023 | A | | 10/2019 | |
| JP | 2022513569 | A | | 2/2022 | |
| KR | 100752901 81 | | | 8/2007 | |
| KR | 200453234 | Y1 | | 4/2011 | |
| KR | 200415097 | Y1 | | 4/2016 | |
| WO | 19911011766 | A1 | | 8/1991 | |
| WO | 1992004662 | A1 | | 3/1992 | |
| WO | 200402136 | A2 | | 3/2004 | |
| WO | 2005054961 | A1 | | 6/2005 | |
| WO | WO-2005110144 | A1 | * | 11/2005 | A44C 17/0291 |
| WO | 2017137915 | A1 | | 8/2017 | |
| WO | 2018055445 | A1 | | 3/2018 | |

* cited by examiner

FIG.5A
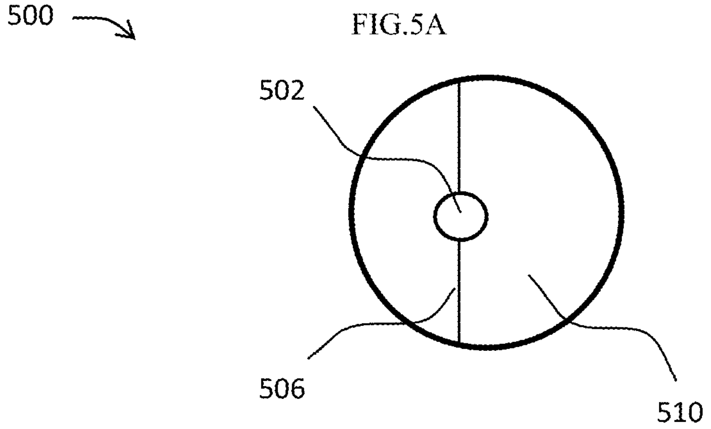
FIG.5C
FIG.5B
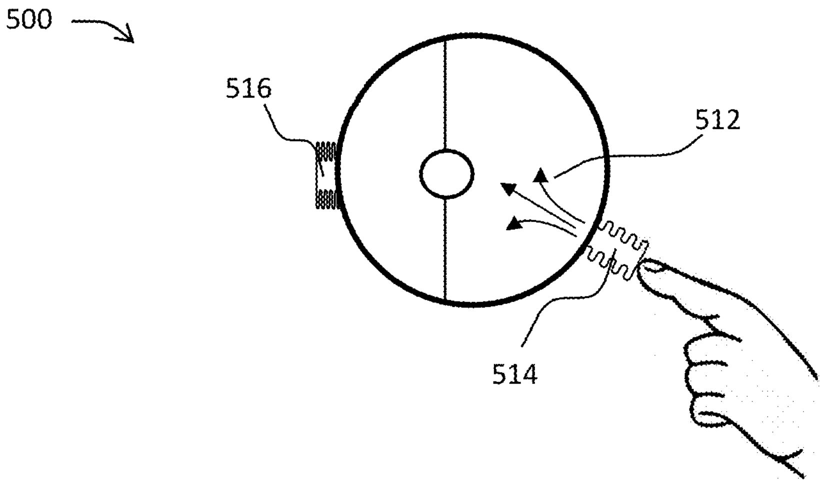
FIG.5D

FIG.6A
FIG.6C
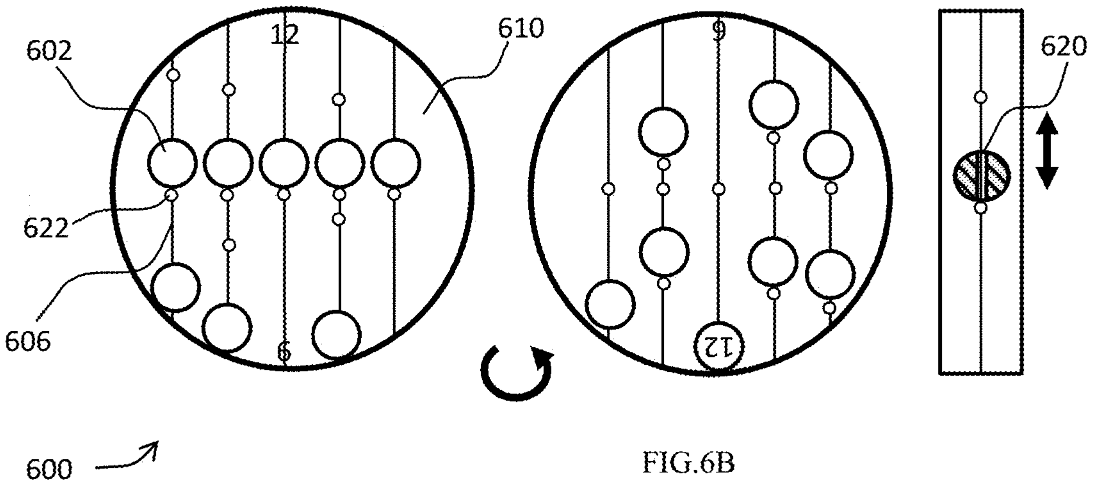
FIG.6B
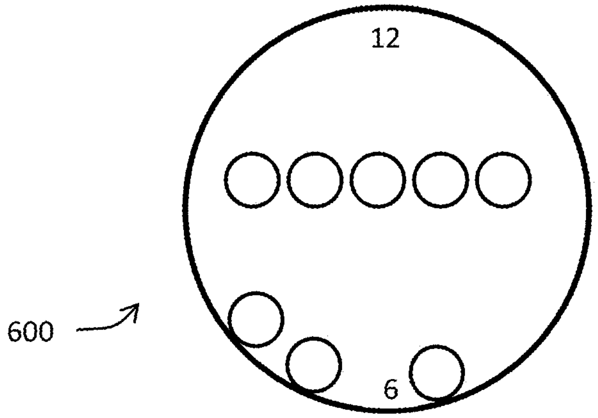
FIG.6D

DEVICE COMPRISING DECORATIVE OBJECTS HAVING RESTRAINED FREEDOM TO MOVE AND SUSPENDED IN FLUID

CROSS REFERENCE TO RELATED APPLICATIONS

This application is a continuation application of U.S. Ser. No. 17/281,653 filed May 31, 2021, which is the National Stage of International Application No. PCT/IB2019/058385, filed Oct. 2, 2019, which claims the benefit of U.S. Provisional Application No. 62/740,251, filed Oct. 2, 2018 and U.S. Provisional Application 62/854,997, filed May 31, 2019, and U.S. Provisional Application 62/828,672, filed Apr. 3, 2019, the content of the entirety of which is explicitly incorporated herein by reference and relied upon to define features for which protection may be sought hereby as it is believed that the entirety thereof contributes to solving the technical problem underlying the invention, some features that may be mentioned hereunder being of particular importance.

COPYRIGHT & LEGAL NOTICE

A portion of the disclosure of this patent document contains material which is subject to copyright protection. The Applicant has no objection to the facsimile reproduction by anyone of the patent document or the patent disclosure as it appears in the Patent and Trademark Office patent file or records, but otherwise reserves all copyright rights whatsoever. Further, no references to third party patents or articles made herein is to be construed as an admission that the present invention is not entitled to antedate such material by virtue of prior invention.

BACKGROUND OF THE INVENTION

The invention relates to wearable accessories such as jewelry.

Most accessories are objects with a permanent shape and decoration.

What is needed is a new way to make accessories more alive by allowing their appearance to change.

SUMMARY OF THE INVENTION

A system and method/apparatus is provided which provides means to create an apparently living decoration for personal accessories. The system is a decorative, wearable device which includes at least one decorative element mechanically and moveably suspended in a fluid by mechanical fixation elements. The fluid shares a substantially similar refraction index as at least one of mechanical fixation or mobile elements.

An object of the invention is to animate decorative objects.

Another object of the invention is to provide a device that changes its appearance when moved.

Still another object of the invention is to provide an invisible and partially moveable fixation to objects and thus provide a magical effect.

BRIEF DESCRIPTION OF THE DRAWINGS

The attached drawings represent, by way of example, different embodiments of the subject of the invention.

FIG. 5A is a top schematic view of a further animated face decoration according to the invention.

FIG. 5B is a cross-section view of the decoration of FIG. 5A.

FIG. 5C is an alternate cross-section view of the decoration of FIG. 5A.

FIG. 5D is a top schematic view of an alternate animated face decoration according to the invention.

FIG. 6A is a top view of a further animated face decoration according to the invention.

FIG. 6B is a top view of the view of FIG. 6A rotated 180 degrees.

FIG. 6C is a right side view of the decoration of FIG. 6A.

FIG. 6D is a top view of the view of FIG. 6A in which the fixation means is invisible.

Those skilled in the art will appreciate that elements in the Figures are illustrated for simplicity and clarity and have not necessarily been drawn to scale. For example, dimensions may be exaggerated relative to other elements to help improve understanding of the invention and its embodiments. Furthermore, when the terms 'first', 'second', and the like are used herein, their use is intended for distinguishing between similar elements and not necessarily for describing a sequential or chronological order. Moreover, relative terms like 'front', 'back', 'top' and 'bottom', and the like in the Description and/or in the claims are not necessarily used for describing exclusive relative position. Those skilled in the art will therefore understand that such terms may be interchangeable with other terms, and that the embodiments described herein are capable of operating in other orientations than those explicitly illustrated or otherwise described.

DETAILED DESCRIPTION OF THE PREFERRED EMBODIMENT

The following description is not intended to limit the scope of the invention in any way as it is exemplary in nature, serving to describe the best mode of the invention known to the inventors as of the filing date hereof. Consequently, changes may be made in the arrangement and/or function of any of the elements described in the exemplary embodiments disclosed herein without departing from the spirit and scope of the invention.

The system according to this invention includes at least one decorative element mechanically and moveably suspended in a fluid by mechanical fixation elements, the fluid sharing a substantially similar refraction index as at least one of mechanical fixation or mobile elements.

Figure 1A:
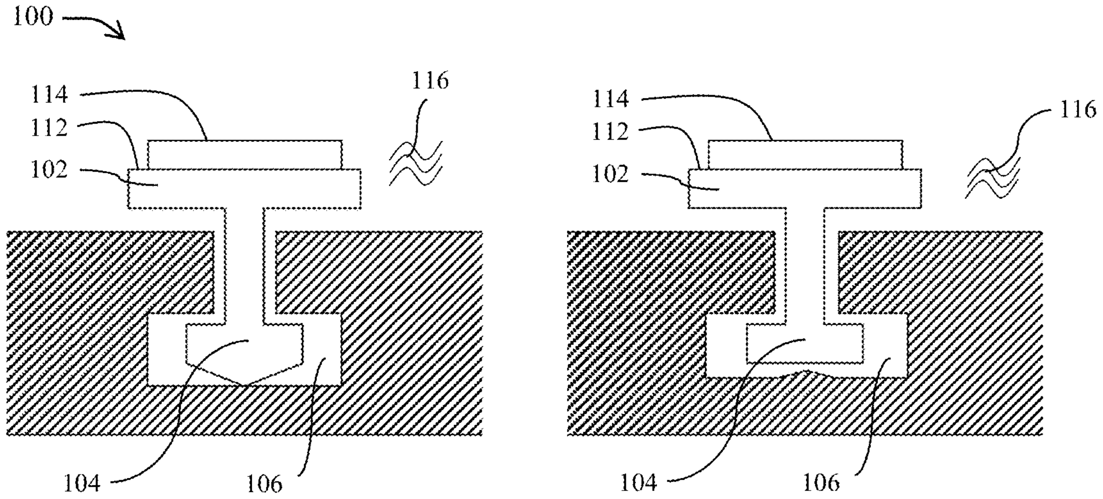
FIG. 1A is a cross-section view of a cross-sectional view of a fixation arrangement of the invention.
Figure 1B:
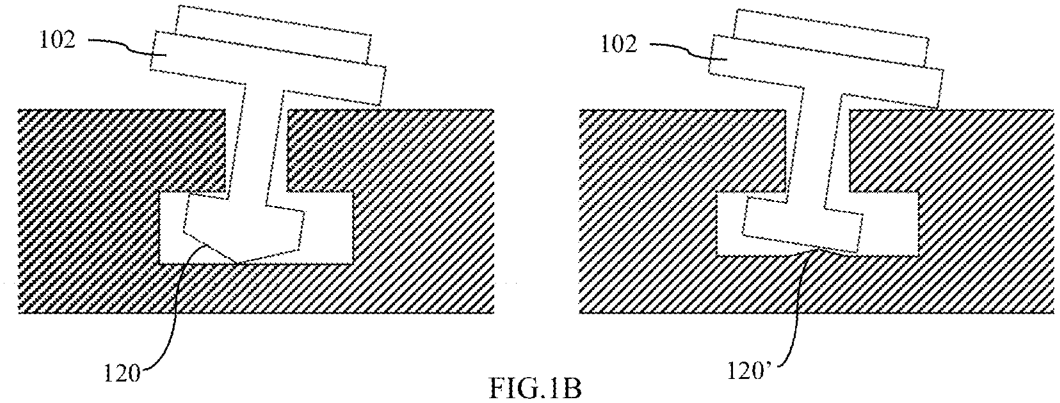
FIG. 1B is a cross-section view of a first alternate series of fixation arrangements of the invention.
Figure 1C:
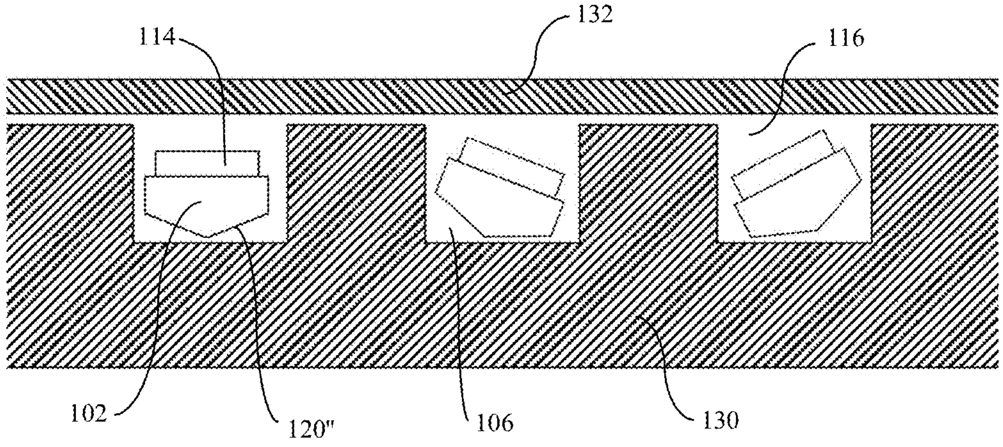
FIG. 1C is a cross-section view of second alternate series of fixation arrangements of the invention.

Referring now to FIG. 1A to 1C, a system 100 with one or more floating decorative elements 102, the floating elements are restrained in their freedom to move or tilt. The floating decorative elements 102 may comprise movable pillars or standoffs 104 (either machined out of bulk material to be mechanically kept in place or individually assembled into recesses 106). Movement is restrained by geometry of an end 110 in the recess 106 (such as in a lose dovetail interconnection allowing ample clearance for movement), for example, to a certain angles in all planar direction. These pillars 104 could have a larger top portion 112 which could be coated with gold 114 for instance to get a paillettes or glitter effect from light reflection when juxtaposed with other such floating decorative elements 102. The pillars 104 could be also coated with other types of metal as well, as herein described. Also a protective layer (not shown but covering the surfaces which are to be isolated) could be applied in order to avoid reaction between the pillars and the surrounding fluid 116. Combinations of the different types of layers are possible. Further, individual precious parts or decoration could be placed on these pillars 104, or on the top portion 112 thereof.

Referring in particular to FIGS. 1B and 1C, inclining of the floating decorative elements 102 can be enforced or promoted by geometric feature (such as inclined surface 120, 120', 120'') below the pillar 104. In addition, the combination of the pillar/recess shaping can alternatively be used or combined to predetermine the inclining direction.

Referring in particular to FIG. 1C, the floating decorative elements 102 may also be held between a bottom plate 130 and a top plate 132. Bottom plate 130 and top plate 132 is advantageously made of a material with a refraction index similar to the refraction index of the surrounding fluid 116 so as to be substantially invisible to the wearer.

Pillar and support material made from a glass or transparent polymer material to which an index matching liquid can be found.

Figure 2:
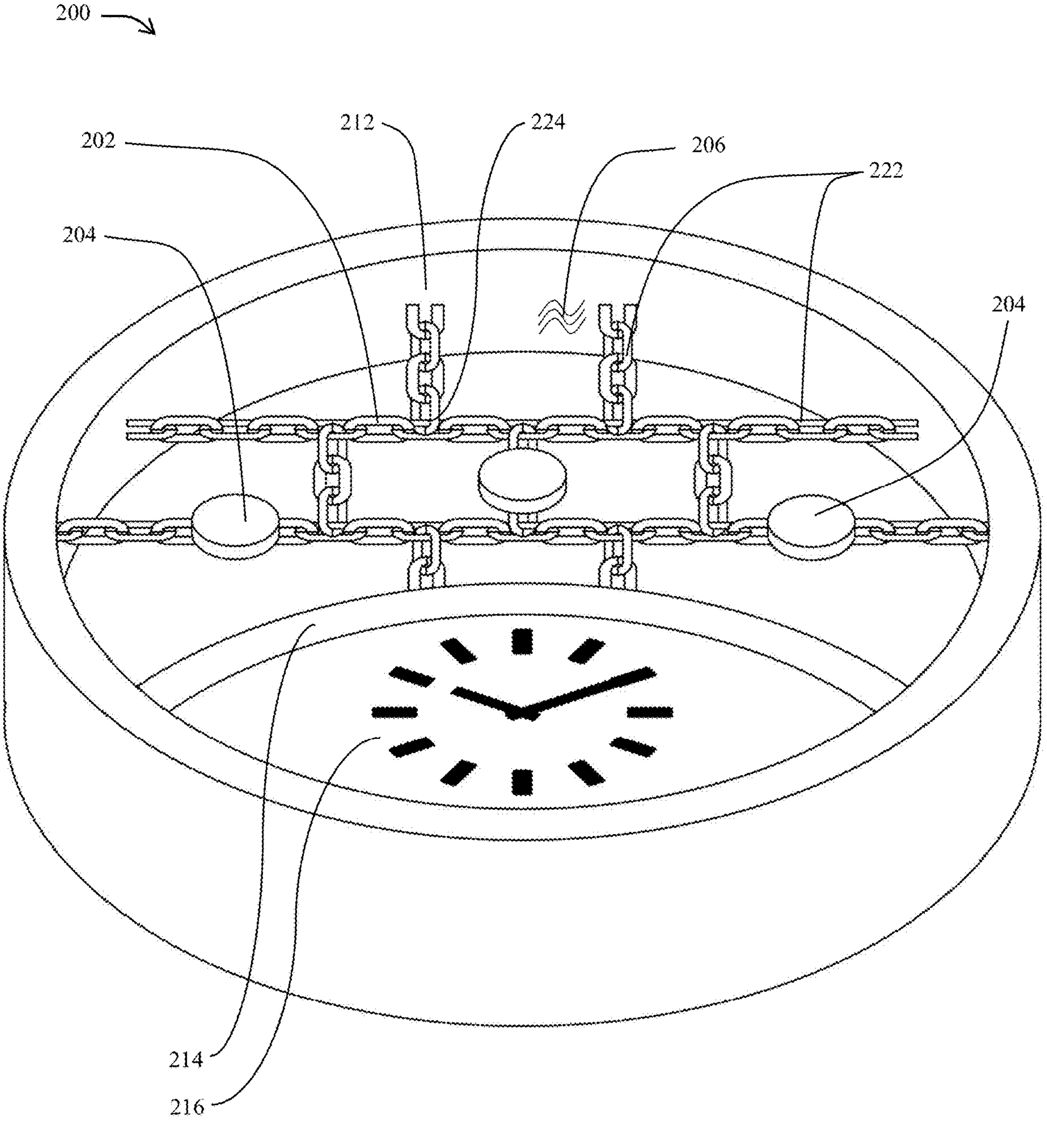
FIG. 2 is a top schematic view of a watch face using elements of the invention.

Referring now to FIG. 2, a system 200 of a glass chain mesh 202 machined out of bulk glass material to which a refraction index matching liquid 206 can be found. The glass chain mesh 202 includes links 222 connecting to knots 224 and a frame 212. A frame bridge 214 demarks a watch face 216 with hands or another indicator such as temperature.

The mesh 202 is suspended in a frame made from the same bulk material. The mesh links 222 are structured in such a way so that the mesh interlinking knots 224 can move in a limited way in plane. These knots 224 can be structured to contain a larger surface on which coatings can be applied or other things be mounted on them. Decorative elements 204 may be mounted on the links or on the knots to form a picture.

Figure 3A:
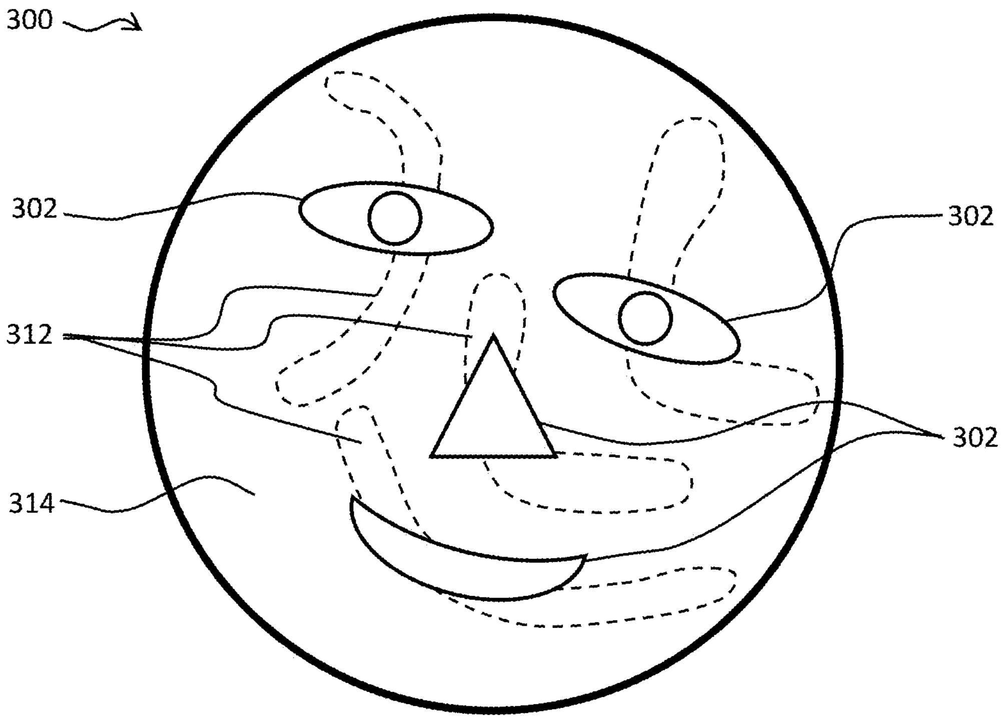
FIG. 3A is a top schematic view of an animated face decoration according to the invention.
Figure 3B:
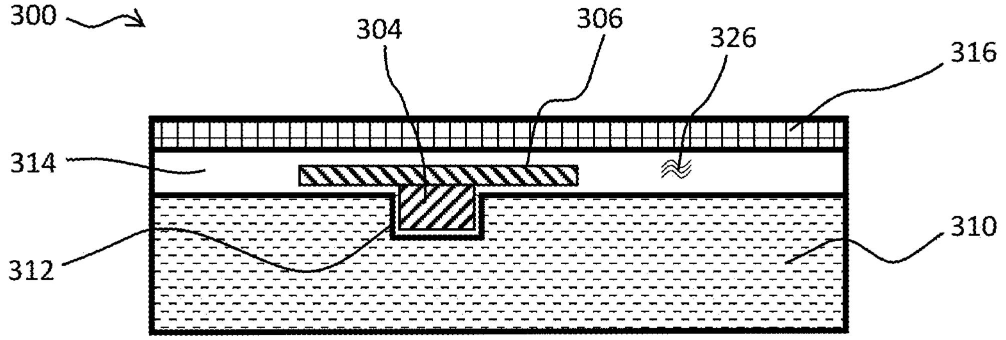
FIG. 3B is a cross-section view of the decoration of FIG. 3A.

Referring now to FIG. 3A to 3B, a system 300 where decorative moving parts 302 are guided by channels 312. The substrate 310 is made of transparent material wherein the channels 312 could be etched by laser for instance. Alternative processes for creating the channels 312 in the substrate 310 may use chemical etching, spark-assisted chemical etching, mechanical machining, injection molding, hot embossing, or any combination of such processes. The decorative moving part 302 are composed with a support 304 made of any material that can slide in the channel 312. Any precious element 306 could be mounted on the support 304.

A fluid 326 fills the cavity 314 that matches the refractive index of substrate 310 to make the channels 312 invisible. For example a crystal 316 closes the cavity 314 and is of transparent material. Moreover, the fluid 326 may be a liquid and act as lubricant on the system. The liquid may be transparent or colored.

The gravity is the actuation principle. However, gravity can be substituted with any other actuation principle that creates an acceleration or deceleration force.

The geometry of the moving parts 302 and their sliding paths made of channels 312 must be selected so as to avoid the system getting stuck in a position.

The support 304 of the decorative moving part 302 is optionally round so that the moving part can turn itself around in the channel 312 thus changing the orientation of the precious element 306. On the other hand, the shape of the support 304 is optionally designed in order to limit the rotation of the decorative moving parts 302.

Figure 4A:
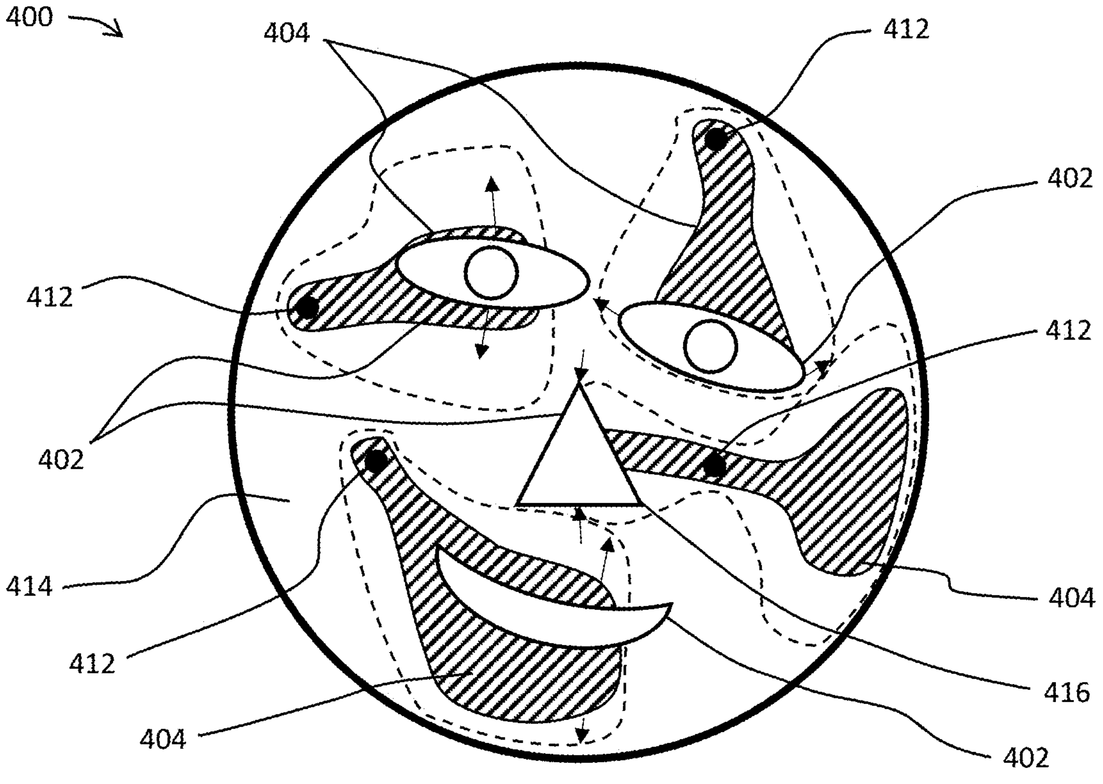
FIG. 4A is a top schematic view of another animated face decoration according to the invention.
Figure 4B:
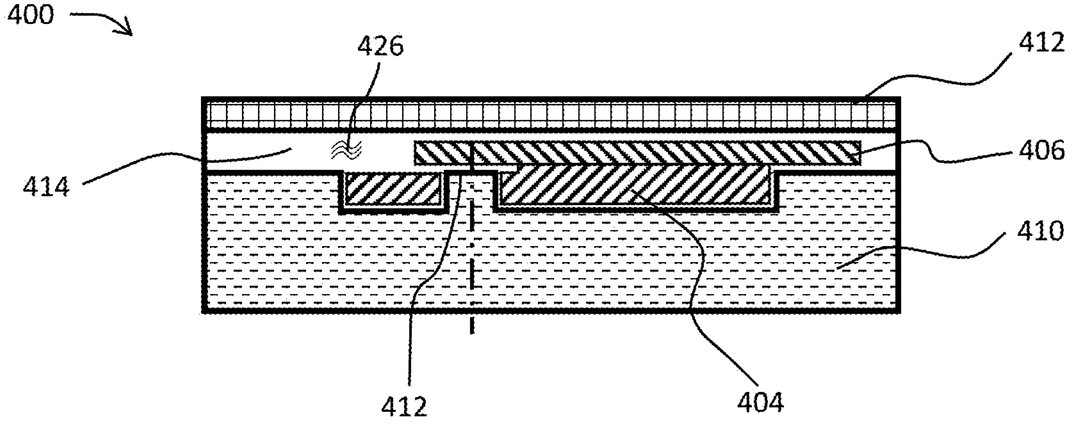
FIG. 4B is a cross-section view of the decoration of FIG. 4A.
Figure 5E:
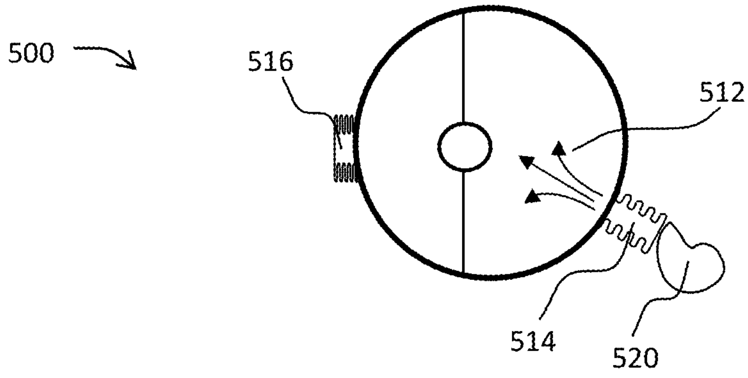
FIG. 5E is a top schematic view of a further animated face decoration according to the invention.
Figure 6E:
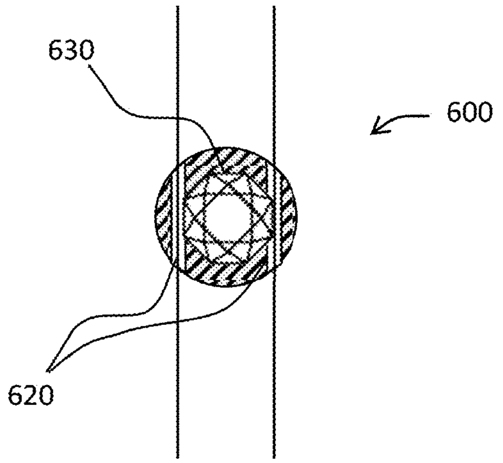
FIG. 6E is a top view of a decoration suspended in the arrangements of FIGS. 6A-6D.

Referring now to FIGS. 4A to 4B, a system 400 where the decorative moving parts 402 are guided in rotation around pillars 412. The substrate 410 is in transparent material wherein the pillars 412 could be etched by laser for instance. Alternative processes for creating the pillars 412 in the substrate 410 may use chemical etching, spark-assisted chemical etching, mechanical machining, injection molding, hot embossing, or any combination of such processes. The decorative moving part 402 is optionally composed with a support 404 whereon any precious element 406 could be mounted. The supports 404 could be made in the same transparent material. The supports 404 might be hidden by the precious element 406.

A fluid 426 fills the cavity 414 that matches the refractive index of the transparent material to make the pillars 412 and the supports 404 invisible. Moreover, the fluid 426 may be a liquid and may act as lubricant on the system. The liquid 426 can be transparent or colored.

The gravity is the actuation principle. The gravity can be substituted with any other acceleration or deceleration force.

The geometry of the rotating parts must be designed in order to avoid the system getting stuck in a position. The support 404 of the rotating part could be limited in their movement by the etched structure of the substrate 410.

It is possible to make counter intuitive movements when the rotating parts have a bigger mass on the other side of the rotating axis defined by the pillar 412 as shown with the nose 416 of the FIG. 4A.

Referring now to FIGS. 5A to 5E, a system 500 where a solid decorative element 502 is fixed to a thin fibre 506 surrounded by a fluid 510. The fibre 506 has the same or substantially similar refractive index as the surrounding fluid 510 making it essentially invisible. The fluid may be a liquid. The fluid may be transparent or colored. Due to the torsion of the fibre 506, the solid decorative element 502 can twist slightly around the fibre, giving an effect of movement.

In one embodiment, a flow 512 of the fluid 510 is generated by the compression of a first flexible chamber 514. The fluid 510 displaced by the compression of the first flexible chamber 514 fills the secondary flexible chamber 516, and when the pressure on the first flexible chamber 514 is released, the fluid 506 moves back to its original state, generating a flow in the opposite direction. The actuation of the first flexible chamber 514 can be actuated manually or by a mechanical system 520. Of course, the positioning of the flexible chambers 514 and 516 shown here are shown in an exemplary manner and may be positioned differently.

Referring now to FIGS. 6A to 6E, a system 600 comprising a chamber with one or more fibres 606, the fibres attached at side walls of the chamber and spaced apart from each other or with a defined spacing, all being surrounded by fluid 610. The fibres 606 have the same refractive index as the fluid(s) 610 so that they are made invisible. The fluid(s) may be transparent or colored. Mobile solid decorative elements 602 can move along the fibres 606, guided by a hole 620 through which they are linked to the fibres 606. Optionally, some stopping elements 622 made with similar index of refraction as the fluid are fixed at specific location of the fibres 606 and restrict the displacement of the mobile decorative elements 602 along the fibres 606. Depending on the orientation of the device and the position of the stopping elements, the mobile decorative elements 602 can be arranged in a predefined manner. For example, they can be aligned horizontally when the device is vertical and randomly disposed when the device is upside down. In one embodiment, the one or more mobile decorative elements 602 can be made of precious elements 630 or the precious element can be mounted on one or more mobile elements. The mobile decorative elements may be guided by two fibres in order to ensure a defined orientation.

Referring now to FIGS. 7A to 7B, and FIGS. 8A and 8B, a system 700 to be integrated in a wearable accessory, comprising a decorative element 702. The system may move in one or more directions as biased by gravity, or by a movement of the user wearing the accessory, or by an external force, or by the user triggering the movement of the surrounding fluid(s) 726, or by a mechanical transmission moving the guiding element 706; such mechanical transmission may be activated by the user or by a clock system, such clock system being electrically or mechanically powered and may be electronically controlled. The decorative element 702 is attached by an attachment 704 to a guiding element 706. Such attachment 704 may be completely rigid, or allow for some movement freedom (slack in one or more directions). The guiding element 706 may have the same refraction index as the surrounding fluid 726 so as to be invisible. The guiding element 706 is affixed to a support 722 via a guiding feature 724, the support being for example attached to a decoration image background. The support 722 may have the same refraction index as the surrounding fluid 726 to be invisible. The surrounding fluid 726 may be a liquid. The surrounding fluid 726 may be transparent or colored. A guiding feature 724 for the guiding element 706 may allow for one or more directions of free movement. The decorative element 702 may be moved by gravity, by the movement of the surrounding fluid(s), or by mechanical action on the guiding element 706, or any combination thereof.

Figure 7A:
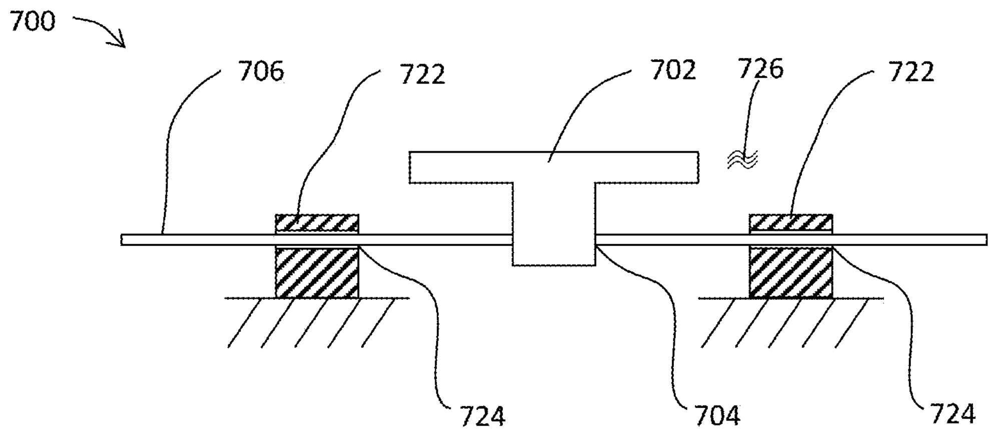
FIG. 7A is a cross-section view of a still further animated face decoration according to the invention.
Figure 7B:
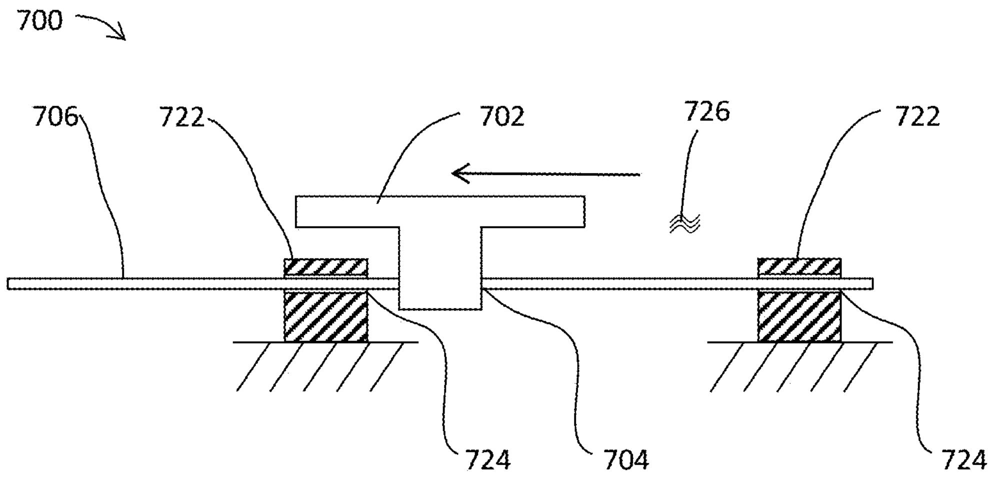
FIG. 7B is the view of FIG. 7A with the decorative element moved to the left.
Figure 8A:
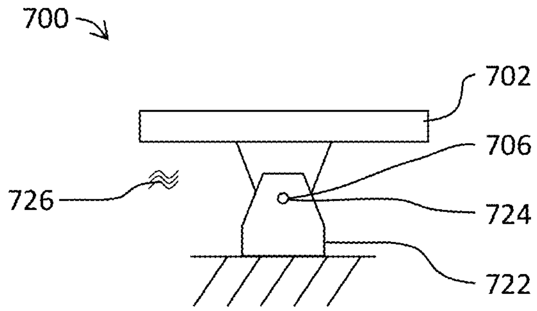
FIG. 8A is a side view of an alternate fixation on a swivel.
Figure 8B:
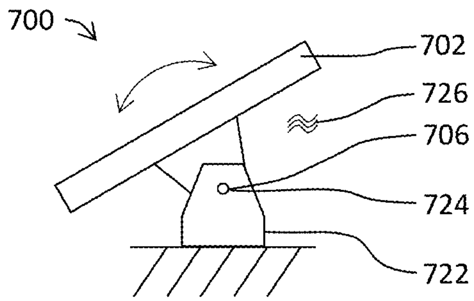
FIG. 8B is a side view of the alternate fixation of FIG. 8A showing the fixation tilted.

FIGS. 7A to 7B show an example of limited free linear movement of the decoration element 702 relative to the supports 724. FIGS. 8A to 8B show an example of limited free rotation movement of the decoration element 702 relative to its support 724.

Figure 9:
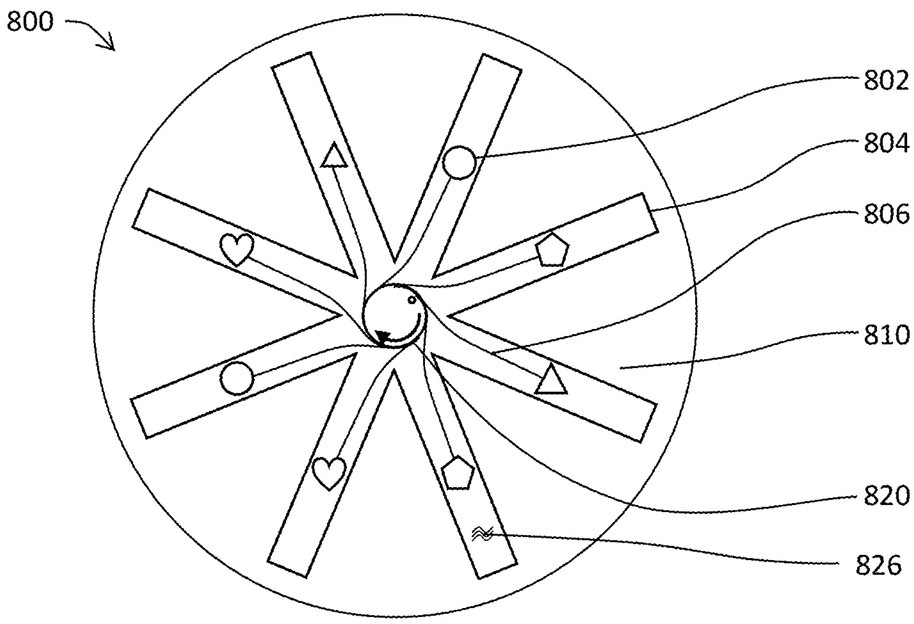
FIG. 9 is a top view of a still one more alternate fixation arrangement of the invention.
Figure 10:
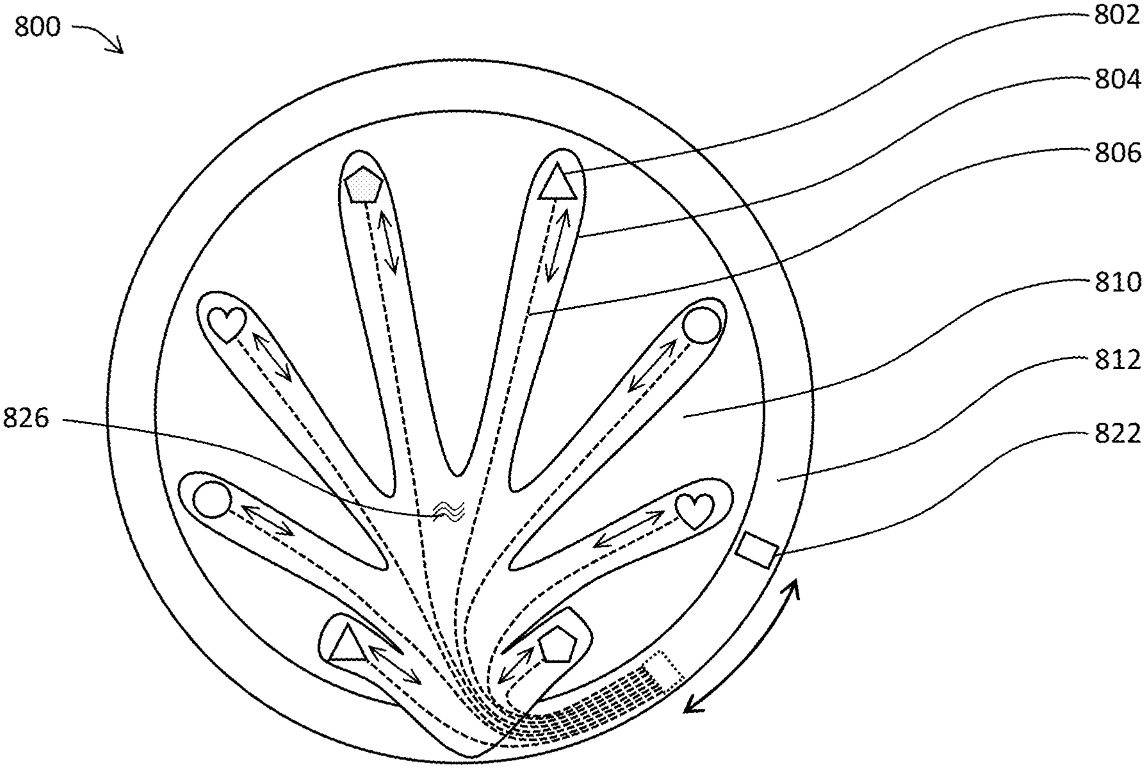
FIG. 10 is a top view of a further alternate fixation arrangement of the invention.

Referring now to FIGS. 9 and 10 the decorative elements 802 are guided by channels 804 and moved by a transmission element 806 which is transmitting a movement generated by the user via a pulley 820, a slider 822, or any other appropriate mechanism (not represented here). Instead of being generated by the user, the movement may also be generated by a clock system, such clock system being electrically or mechanically powered and may be electronically controlled. The guiding of the decorative elements 802 in the channels 804 may allow some degree of freedom in several directions to give the decorative elements 802 a more lively behavior when the system 800 is moved relative to gravity, or when the system 800 is accelerated in any direction by its wearer. Parts of the transmission mechanism that are in the visible area of the accessory 810 may be made in a material with a refraction index close to the refraction index of the surrounding fluid to be invisible. For example, the transmission elements 806 may be advantageously made of glass fibers. The surrounding fluid may be a liquid. The surrounding fluid may be transparent or colored. Parts of the transmission mechanism that are in non-visible areas of the accessory 812 may be made in any material appropriate for their function.

Figure 11A:
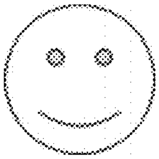
FIGS. 11A and 11B are schematic views of the fixation arrangement of the invention, conveying different messages.
Figure 11B:
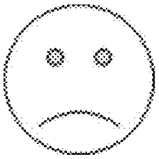

The system is not only able to provide a "living" impression of a given image, the image remaining the same but its components moving in a random manner, but it may also be configured in such a way so as to generate different predefined images depending on the position of the mobile elements, as triggered by different orientations of the system or by the activation of the animation. An example is shown in FIGS. 11A and 11B, where the mouth orientation changes the image.

Figure 12:
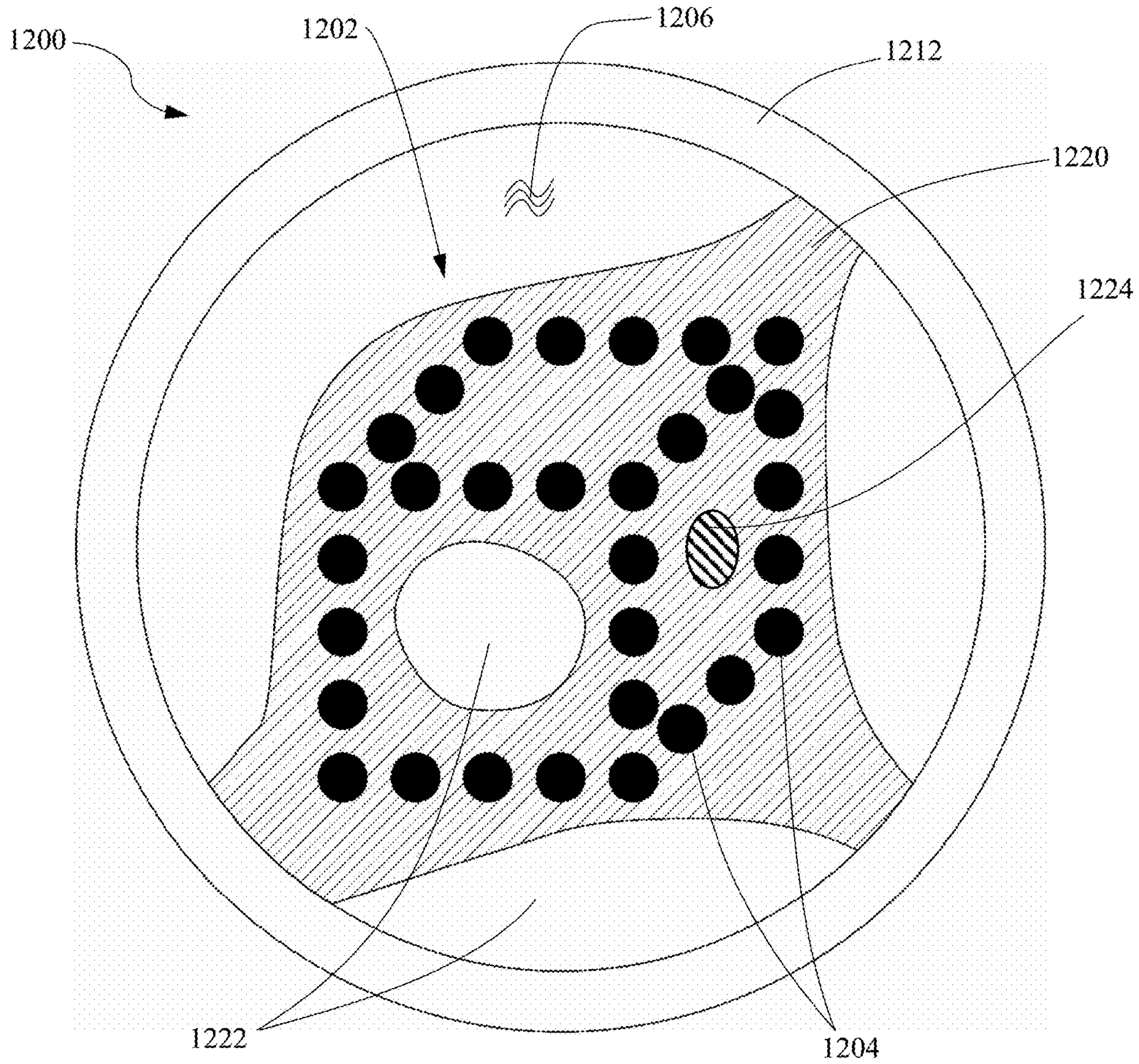
FIG. 12 is a top schematic view of an alternative embodiment of the invention.

Referring now to FIG. 12, the system 1200 is optionally realized as a membrane 1220 attached to the outer frame 1212 of the fluidic capsule. The membrane 1220 is optionally continuous and close the system along the frame 1212, or may have apertures 1222 so as to locally modify its stiffness or as to allow the circulation of the surrounding fluid 1206. Materials for the membrane 1220 is optionally selected so as to have a refractive index very close to the refractive index of the surrounding fluid 1206, preferably the same refractive index as the refractive index of the surrounding fluid 1206 so as to appear invisible to the eye of the observer/user. Such membrane may be made of several layers of the same material or of different materials, such as Parylene, glass, silicone or the like. Decorative elements 1204 are attached to the membrane 1220 and form together one or more images 1202.

Within the entirety of this application, it shall be understood that images may be figurative and non-figurative representations. The decorative elements 1204 may be made of polymers, metal, precious metal, may be crystals, diamonds, encapsulated liquids or gels, or any decorative element as appropriate for the purpose of creating one or more images 1202. The decorative elements 1204 may be of various sizes and shapes. Additional ballast elements 1224 may be made in a material with a refractive index very close to the refractive index of the surrounding fluid 1206, preferably the same refractive index as the refractive index of the surrounding fluid 1206 so as to appear invisible to the eye of the observer/user, for the purpose of ballasting the membrane 1220. The movement of the membrane 1220 as generated by a movement of the system relative to gravity, by an acceleration of the system when moved by the user/wearer, or by the movement of the fluid 1206 propagates to the decorative elements 1204 and gives the appearance of animated images 1202.

Figure 13A:
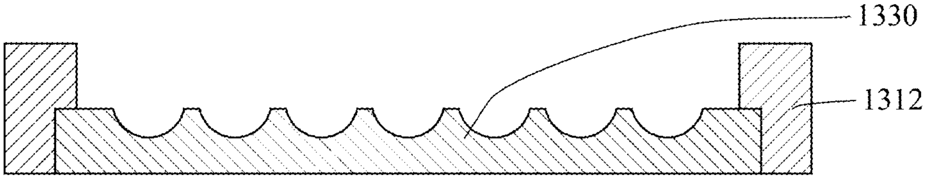
FIGS. 13A-13E are cross section schematic views of a method to manufacture an embodiment of the invention.
Figure 13B:
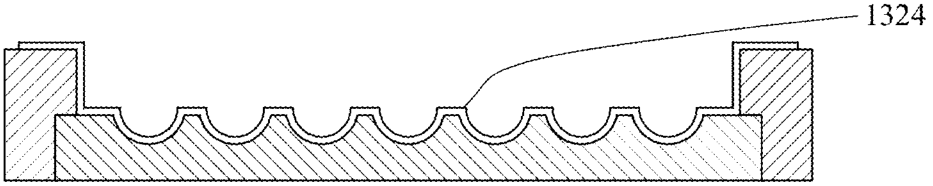
Figure 13C:
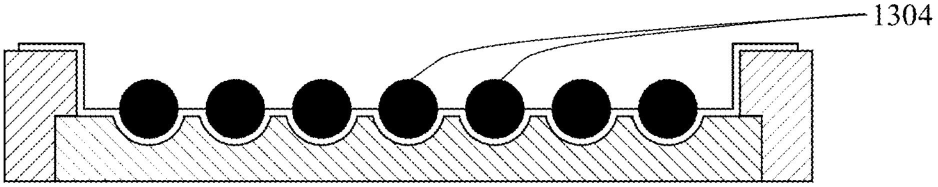
Figure 13D:
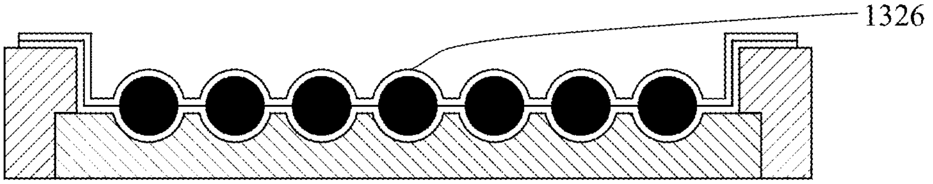
Figure 13E:
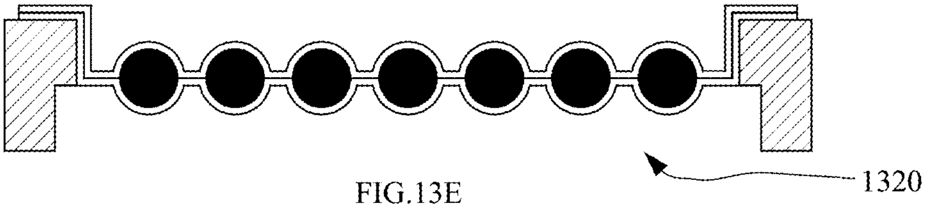

Referring now to FIGS. 13A-13E, the membrane 1320 containing the decorative and/or ballast elements 1304 may be produced by the following method:

a. FIG. 13A: A shape tool 1330 is placed in the frame 1312 b. FIG. 13B: A first membrane 1324 is deposited on the frame and on the shape tool 1330. Such membrane may be made of several layers of the same material or of different materials, such as Parylene, polymers, glass, silicone or the like. The deposition process includes CVD (Chemical Vapor Deposition), PVD (Physical Vapor Deposition), or any suitable process that allows depositing a substantially regular, preferably conformal layer.

c. FIG. 13C: The decorative and/or ballast elements 1304 are placed at predefined locations on the first membrane 1324, forming the desired one or more images.

d. FIG. 13D: A second membrane 1326 is deposited on the decorative and/or ballast elements 1304 and on the first membrane 1324. Materials and processes for the second membrane 1326 are very similar to the materials and processes for the first membrane 1324, so that the first membrane 1324 and the second membrane 1326 merge together and form homogeneous membrane 1320 containing the decorative and/or ballast elements 1304.

e. FIG. 13E: The shape tool 1330 is removed, leaving the membrane attached to the frame 1312 only.

Note that not all details of each and every step of the process is described here, as such knowledge is known in the industry. Obviously, processes such as cleaning, anti-adhesive surface treatments, and the like shall be used in the above method.

Figure 14A:
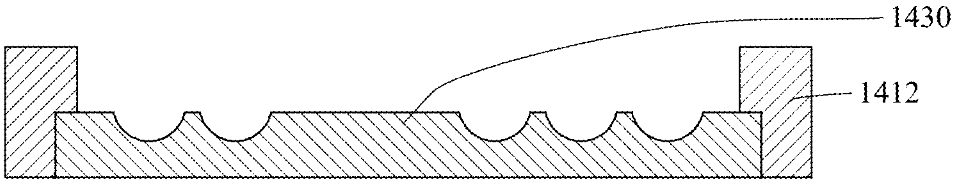
FIGS. 14A-14F are cross section schematic views of a method to manufacture an alternative embodiment of the invention.
Figure 14B:
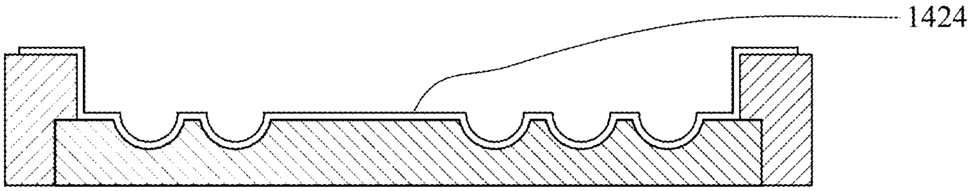
Figure 14C:
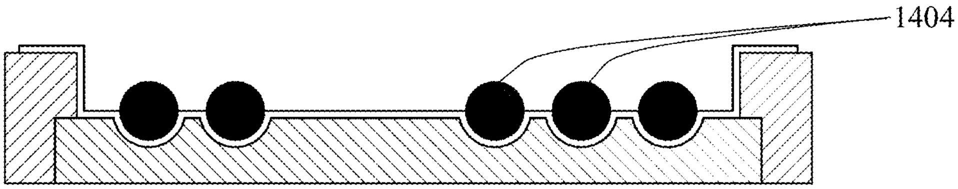
Figure 14D:
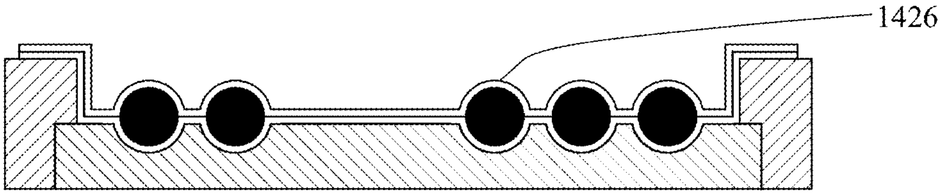
Figure 14E:
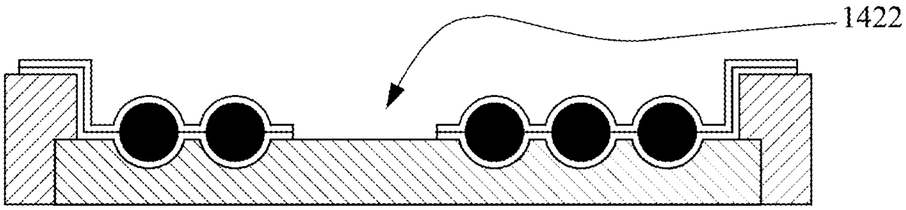
Figure 14F:
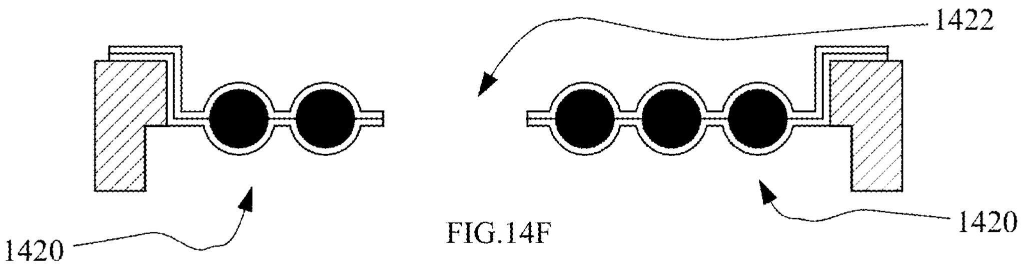
Figure 15A:
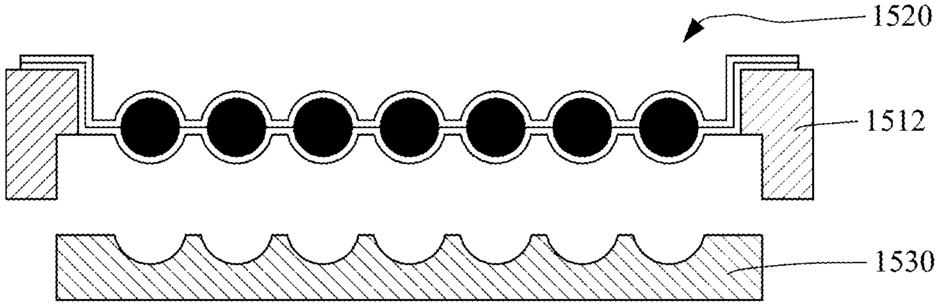
FIGS. 15A-15D are cross section schematic views of alternative tools that may be used in a method to manufacture an embodiment of the invention.
Figure 15B:
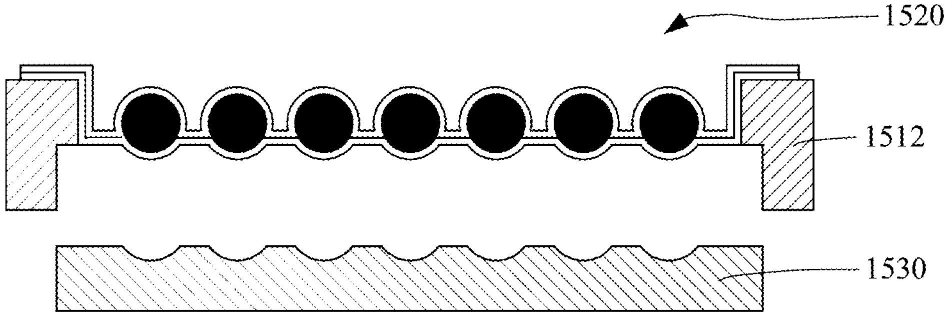
Figure 15C:
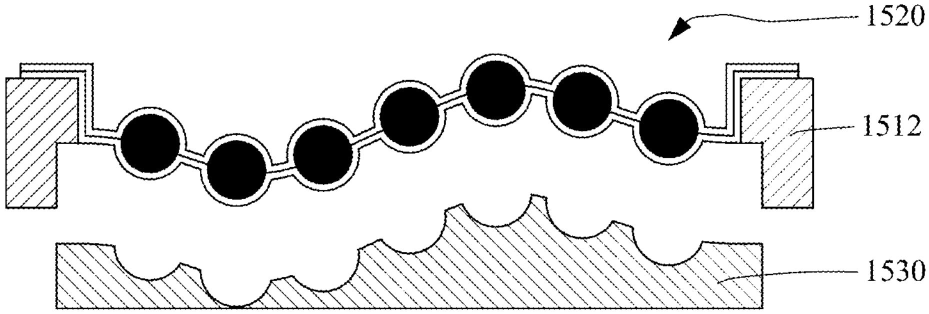
Figure 15D:
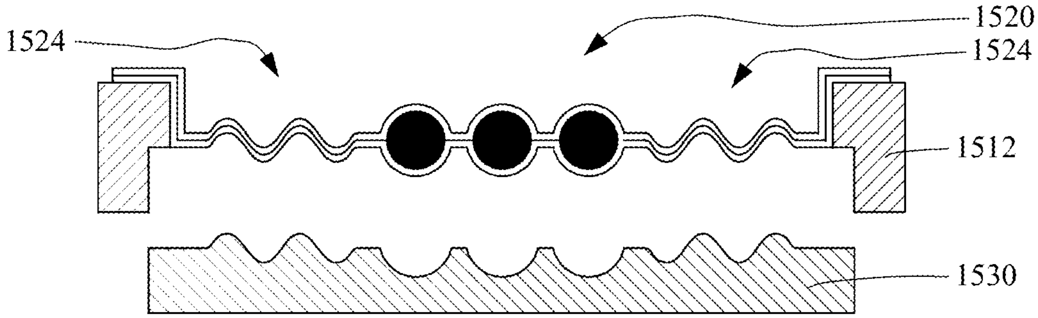

Referring now to FIGS. 14A-14F, the membrane 1420 containing the decorative and/or ballast elements 1404 and having apertures 1422 may be produced by the following method:

a. FIG. 14A: A shape tool 1430 is placed in the frame 1412 b. FIG. 14B: A first membrane 1424 is deposited on the frame and on the shape tool 1430. Such membrane may be made of several layers of the same material or of different materials, such as Parylene, polymers, glass, silicone or the like. The deposition process may include CVD (Chemical Vapor Deposition), PVD (Physical Vapor Deposition), or any suitable process that allows depositing a substantially regular, preferably conformal layer.

c. FIG. 14C: The decorative and/or ballast elements 1404 are placed at predefined locations on the first membrane 1424, forming the desired one or more images.

d. FIG. 14D: A second membrane 1426 is deposited on the decorative and/or ballast elements 1404 and on the first membrane 1424. Materials and processes for the second membrane 1426 are very similar to the materials and processes for the first membrane 1424, so that the first membrane 1424 and the second membrane 1426 merge together and form a homogeneous membrane 1420 containing the decorative and/or ballast elements 1404.

e. FIG. 14E: An aperture 1422 may be cut in the membrane, using process like laser cutting, chemical etching, stamping, or any other appropriate process as known in the industry.

f. FIG. 14F: The shape tool 1430 is removed, leaving the membrane attached to the frame 1412 only.

Note that not all details of each and every step of the process is described here, as such knowledge is known in the industry. Obviously, processes such as cleaning, anti-adhesive surface treatments, and the like shall be used in the above method.

Referring now to FIGS. 15A-15D, the shape tool 1530 may have different geometries as appropriate to obtain specific features and geometries of the membrane 1520. The tool may provide for the membrane 1520 to be flat or substantially flat on one side (FIG. 15B), it may provide for a substantially non-flat membrane (FIG. 15C), it may provide for areas with higher flexibility 1524, or any combination of the above as appropriate for the animation of the one or more images.

Figure 16A:
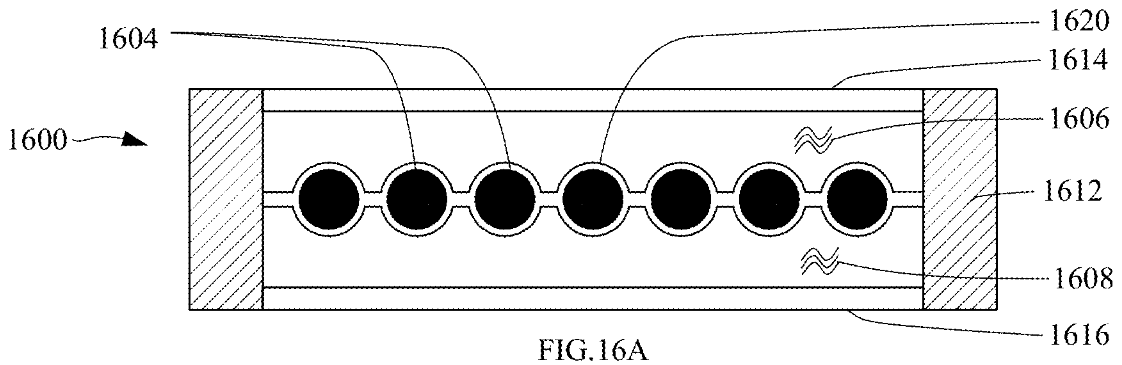
FIGS. 16A-16C are cross section schematic views of further alternative embodiments of the invention.
Figure 16B:
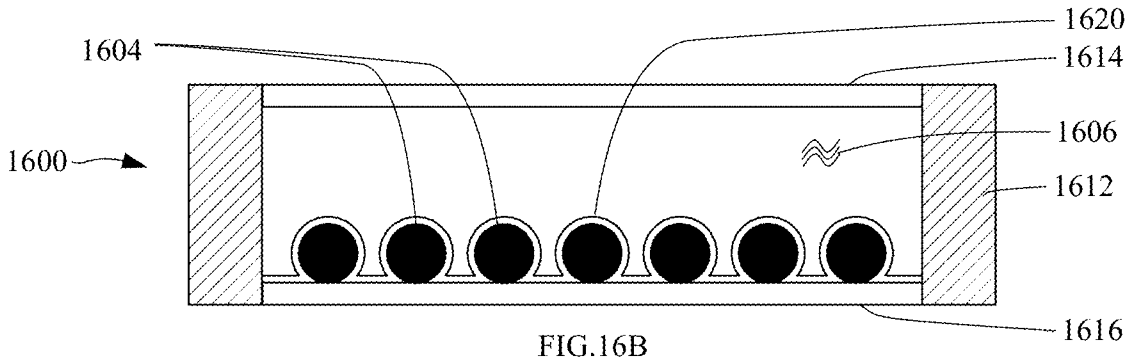
Figure 16C:
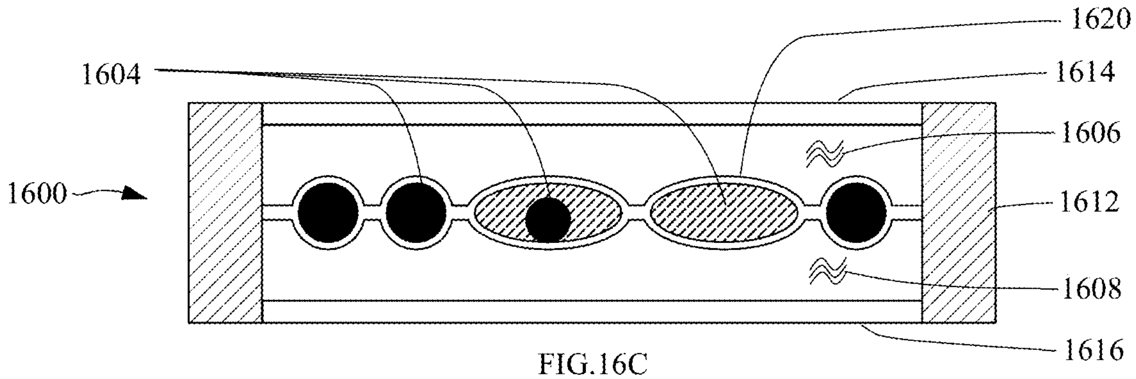

Referring now to FIGS. 16A-16C, several configurations of the system may be used to provide a fluidic capsule 1600 with one or more animated images. The fluidic capsule is formed at least by a frame 1612, a top glass 1614 which is at least in part transparent for the user/wearer to see the animation, and the bottom 1616, which may be opaque, partially or completely transparent to allow the user/wearer to see through the fluidic capsule 1600. The membrane 1620 containing the decorative elements 1604 may be placed at any height inside the capsule 1600, and may separate the capsule 1600 in two or more volumes, which may be filled with different fluids 1606, 1608. A first fluid 1606 may have different physical properties from the second fluid 1608, such as different refraction indexes, different colors, different densities, different viscosities, different magnetic or electrical properties, or any other physical characteristic difference. The fluids may be immiscible. The decorative elements 1604 may be of solid nature, but may also be made of a fluid, a liquid, a gel, or may combine a fluid, a liquid, a gel and one or more solid elements, which are encapsulated in the membrane 1620.

Figure 17A:
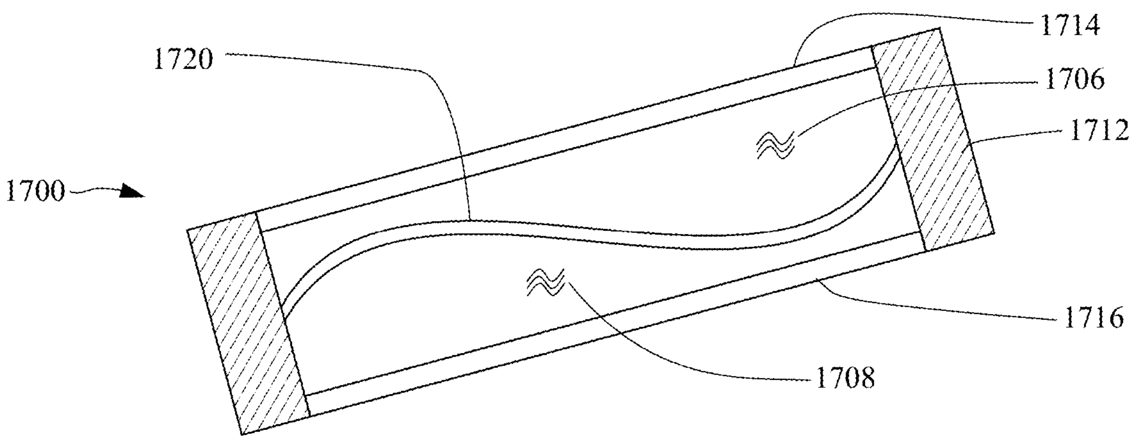
FIGS. 17A-17C are cross section schematic views of an animation method of the invention.
Figure 17B:
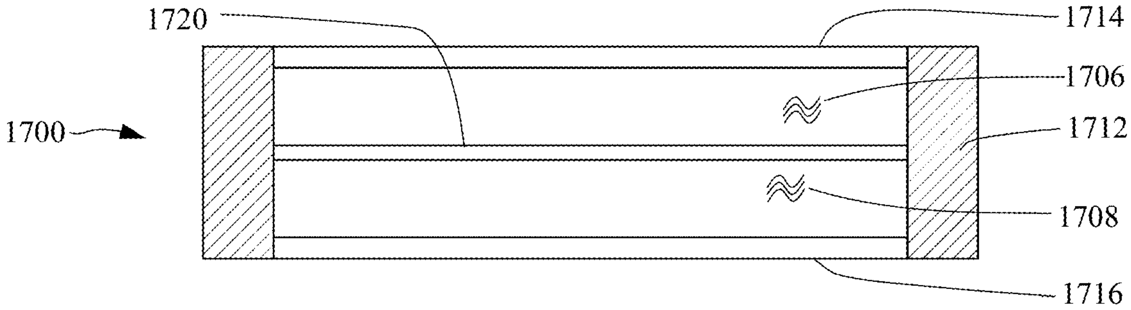
Figure 17C:
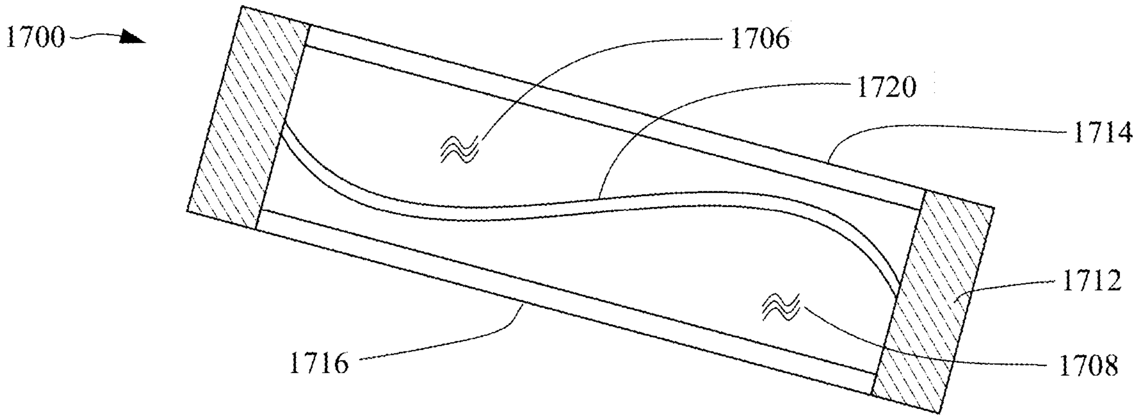

Referring now to FIGS. 17A-17C, the fluidic animation capsule 1700 is formed at least by a frame 1712, a top glass 1714 which is at least in part transparent for the user/wearer to see the animation, and the bottom 1716, which may be opaque, partially or completely transparent to allow the user/wearer to see through the fluidic capsule 1700. Such fluidic capsule 1700 may be filled with two or more different fluids 1706, 1708, with different physical characteristics such as density, viscosity, refraction index, color, electrical or magnetic properties, or any other physical characteristic difference. The fluids may be immiscible. When changing the orientation of the capsule 1700 relative to gravity or when applying an acceleration to the capsule by the user/wearer, the movement of the fluids 1706, 1708 generates a deformation of membrane 1720.

Figure 18A:
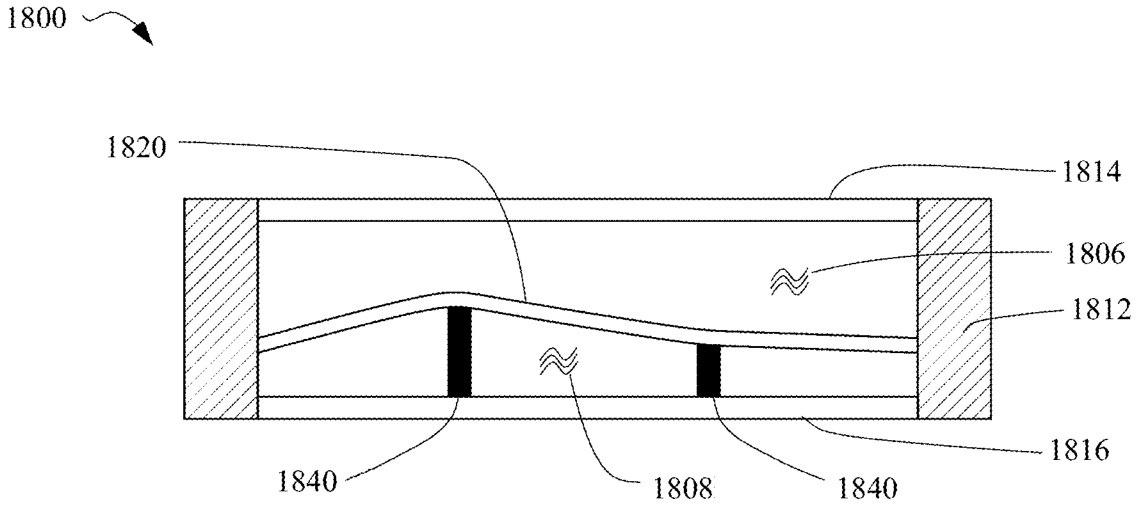
FIGS. 18A-18B are cross section schematic views of alternative animation methods of the invention.
Figure 18B:
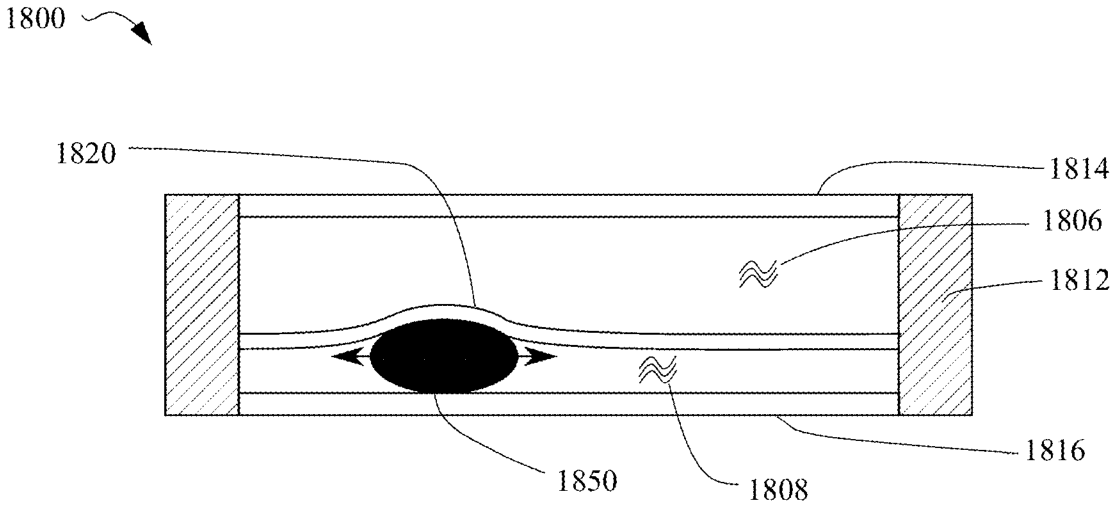

Referring now to FIGS. 18A-18B, the fluidic animation capsule 1800 is formed at least by a frame 1812, a top glass 1814 which is at least in part transparent for the user/wearer to see the animation, and the bottom 1816, which may be opaque, partially or completely transparent to allow the user/wearer to see through the fluidic capsule 1800. A deformation of the membrane 1820 may also be obtained by the combination of using several fluids 1806, 1808 with different physical characteristics (the fluids may be immiscible), but also by using fixed supports 1840, or by adding a mobile solid element 1850 that deforms the membrane when moving. Such fixed supports 1840 or mobile solid element 1850 may be made intentionally visible so as to participate to the animated one or more images, or of materials having a refraction index similar to the surrounding fluids 1806, 1808 to be invisible to the wearer/user.

Figure 19:
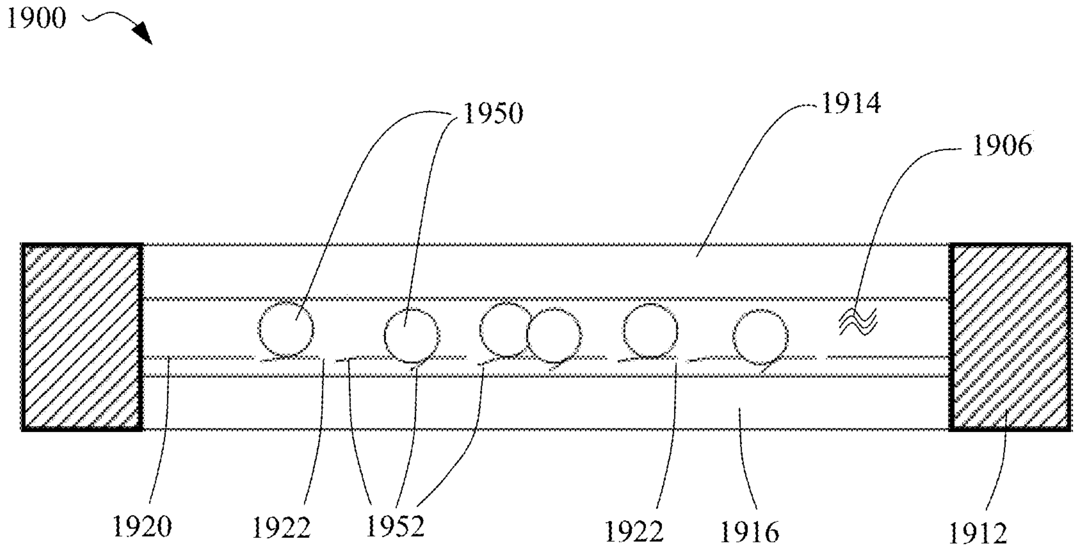
FIG. 19 is a cross section schematic view of alternative embodiment of the invention.

Referring now to FIG. 19, the fluidic animation capsule 1900 is formed at least by a frame 1912, a top glass 1914 which is at least in part transparent for the user/wearer to see the animation, and a bottom 1916, which may be opaque, partially or completely transparent to allow the user/wearer to see through the fluidic capsule 1900. The membrane 1920 may contain apertures 1922 and areas that form flaps 1952. The flaps 1952 constitute very flexible areas, which can be easily deformed when mobile solid elements 1950 rest temporarily or pass upon them, or when the surrounding fluid 1906 moves through the apertures 1922. In this way the local deformations of the membrane 1920 may be increased, enhancing the animation effect. The surface of the flaps and/or the surface of the non-flap sections of the membrane 1920 may carry decoration elements, or may be printed, coated with a metal, or any other decoration method. The mobile solid elements 1950 may be made intentionally visible so as to participate to the animated one or more images, or of materials having a refraction index similar to the surrounding fluid 1906 to be invisible to the wearer/user. The mobile solid elements 1950 are moved by the changes of orientation of the fluidic animation capsule relative to gravity. Some or all of the mobile solid elements 1950 may have a density that is significantly inferior to the density of the surrounding fluid 1906 to have a tendency to move in opposite direction relative to gravity, some or all of the mobile solid elements 1950 may have a density that is significantly superior to the density of the surrounding fluid 1906 to have a tendency to move following gravity.

Referring now to FIGS. 20A-20E, the system 2000 is immersed in a fluid 2006, and contains one or more floating elements 2020 held in a base plate 2030, the floating elements are restrained in their freedom to move or tilt. The floating elements 2020 may comprise pillars 2022 and standoffs 2024, either machined out of the same piece of bulk material constituting the holding plate 2030 or assembled out of several pieces. The holding plate 2030 has apertures 2032, with a dimension larger than the floating element's pillar 2022 so that the floating element 2020 has a limited freedom to move. The standoffs 2024 are large enough to avoid that the floating elements may fall out of the aperture 2032, such as in a loose dovetail interconnection allowing ample clearance for movement, for example, to a certain angle in all planar directions. The surface 2016 of the floating element 2020 may carry a decoration element 2014, or may be printed, coated with a metal, or any other decoration method. A channel 2060 is provided behind the base plate 2030 by the addition of a secondary plate 2062. Mobile elements 2050 are contained in the channel 2060, and are free to move according to the combination of the orientation of the system 2000 relative to gravity, the density of the surrounding fluid 2006 and their own density. The dimension of the channel 2060 is adapted so that at least a part of the mobile elements 2050 touch the standoffs 2024 of the mobile elements 2020, provoking a random movement of the floating elements 2020, the general movement of the floating elements 2020 generating a seemingly live picture. The secondary plate 2062 and the channel 2060 may also be installed on top of the floating elements 2020, in such case the mobile elements 2050 may touch the decoration element 2014 directly while passing, provoking a random movement of the floating elements 2020, the general movement of the floating elements 2020 generating a seemingly live picture. The base plate 2030, the secondary plate 2062, the floating elements 2020 and the mobile elements 2050 may be made of a material presenting a substantially similar refraction index as the refraction index of the surrounding liquid 2006, so as to be substantially invisible to the observer. In such case the decorations 2014 of the floating elements 2020 appear to be suspended invisibly to the observer.

Figure 20A:
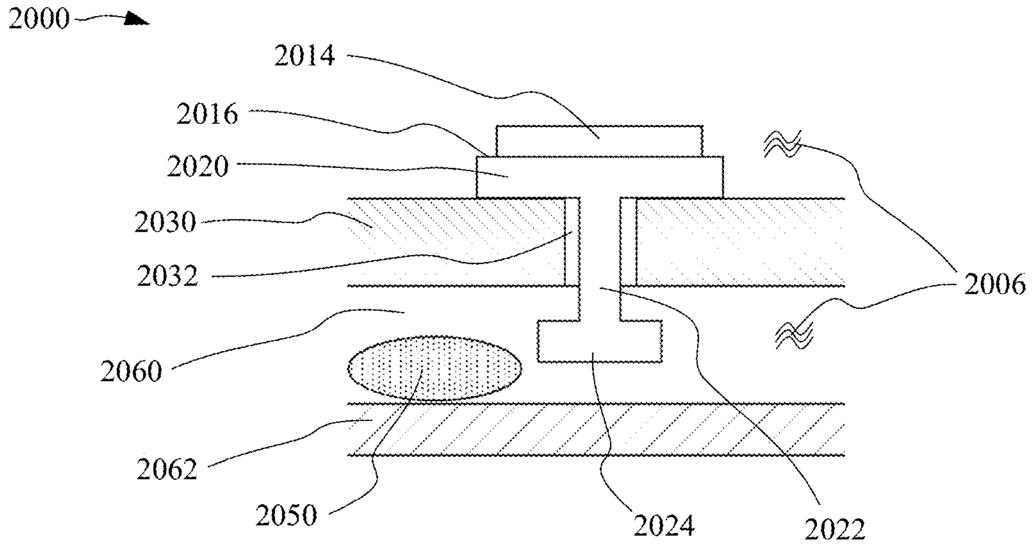
FIGS. 20A-E are cross section schematic views of further alternative embodiments of the invention.
Figure 20B:
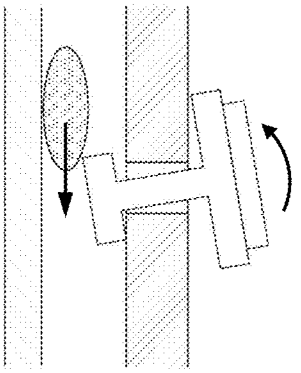
Figure 20C:
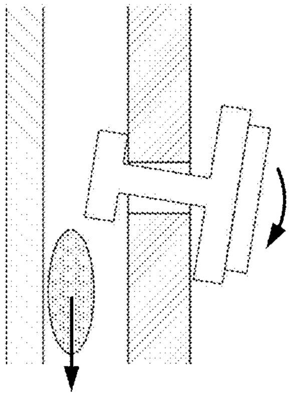
Figure 20D:
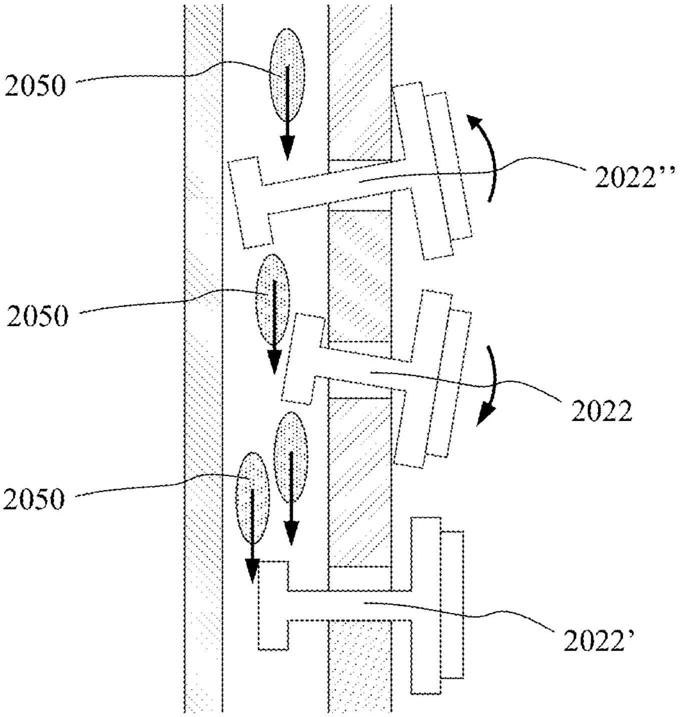

Referring in particular to FIG. 20D, inclining of the floating elements 2020 can be enforced or promoted by changing the pillar length (2022', 2022"). In addition, the combination of the pillar/standoffs shaping can alternatively be used or combined to predetermine the inclining direction.

Figure 20E:
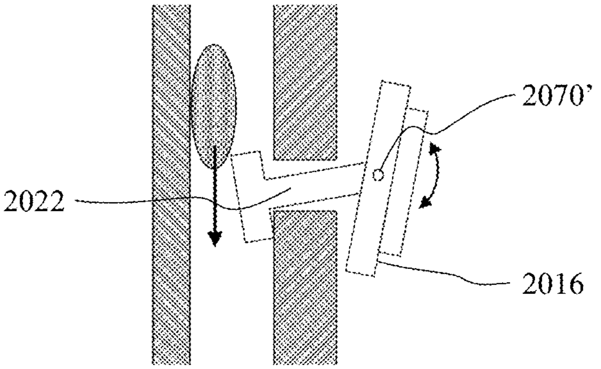

Referring in particular to FIG. 20E, the floating element 2020 can be made of two parts linked together by an articulation 2070. The articulation 2070 allows for the surface 2016 of the floating element 2020 to present a different orientation relative to the pillar 2022 orientation.

Figure 21A:
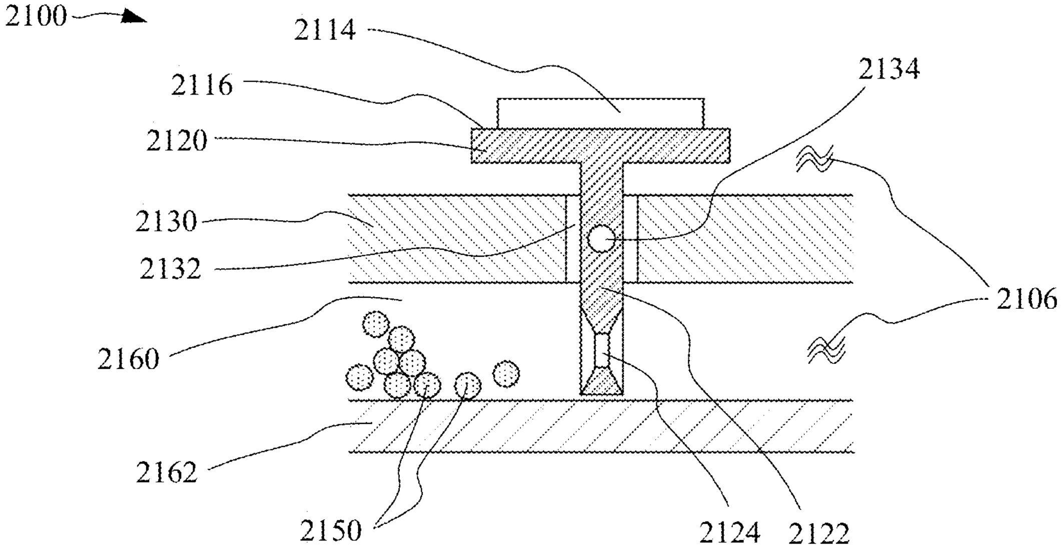
FIGS. 21A to 21C are schematic drawings of another embodiment of the invention.
Figure 21B:
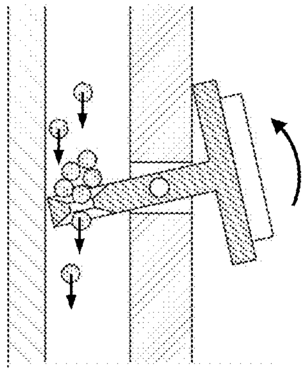
Figure 21C:
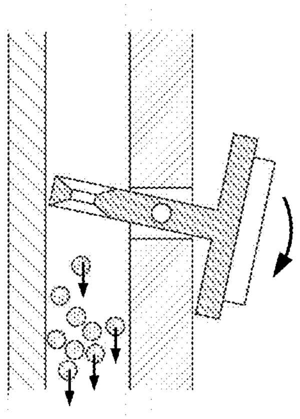

Referring now to FIGS. 21A-20C, the system 2100 is immersed in a fluid 2106, and contains one or more floating elements 2120 held in a base plate 2130 via a rod 2122 and a pivot 2134 or similarly to the loos attachment described in FIG. 20A, so that the floating elements 2120 are restrained in their freedom tilt. The rod 2122 and the pivot 2134 may be either machined out of the same piece of bulk material constituting the holding plate 2030 or assembled out of several pieces. The surface 2116 of the floating element 2120 may carry a decoration element 2114, or may be printed, coated with a metal, or any other decoration method. A channel 2160 is provided behind the base plate 2130 by the addition of a secondary plate 2162. Mobile elements 2150 are contained in the channel 2160, and are free to move according to the combination of the orientation of the system 2100 relative to gravity, the density of the surrounding fluid 2106 and their own density. The rod as a funnel shape 2124 adapted for the passage of the mobile elements 2150. The rod 2122 protrudes in the channel, and its dimension and the dimension of the channel 2160 are adapted so that at least a part of the mobile elements 2150 are forced to pass through the funnel 2124, provoking a random movement of the floating elements 2120, the general movement of the floating elements 2120 generating a seemingly live picture. The size of the funnel 2124 may be adapted relative to the size of the mobile elements 2150 so as to influence the passage time of the mobile elements, adjusting the speed of the animation. In a system 2100 different floating elements 2120 may have different animation timing thanks to their funnel size. The base plate 2130, the secondary plate 2162, the floating elements 2120 and the mobile elements 2150 may be made of a material presenting a substantially similar refraction index as the refraction index of the surrounding liquid 2106, so as to be substantially invisible to the observer. In such case the decorations 2114 of the floating elements 2120 appear to be suspended invisibly to the observer.

Some mobile elements may be hidden in a non-visible part of the system, and appear when the animation is triggered.

Some mobile elements may hide each other in certain positions of the system, and the hidden mobile element would suddenly appear in the image when the animation is triggered.

Some elements may change color when they are on top of each other, for example a semi-transparent yellow part on top of a semi-transparent blue part would appear green.

It should be appreciated that the particular implementations shown and herein described are representative of the invention and its best mode and are not intended to limit the scope of the present invention in any way.

In an advantage, the system and method/apparatus creates an apparently living decoration for personal accessories.

In another advantage, the invention animate decorative objects.

In another advantage, the invention changes its appearance when moved.

In still another advantage, the invention provides an invisible and partially moveable fixation to objects and thus provide a magical effect.

As will be appreciated by skilled artisans, the present invention may be embodied as a system, a device, or a method.

Moreover, the system contemplates the use, sale and/or distribution of any goods, services or information having similar functionality described herein.

The specification and figures should be considered in an illustrative manner, rather than a restrictive manner, and all modifications described herein are intended to be included within the scope of the invention claimed. Accordingly, the scope of the invention should be determined by the appended claims (as they currently exist or as later amended or added, and their legal equivalents) rather than by merely the examples described above. Steps recited in any method or process claims, unless otherwise expressly stated, may be executed in any order and are not limited to the specific order presented in any claim. Further, the elements and/or components recited in apparatus claims may be assembled or otherwise functionally configured in a variety of permutations to produce substantially the same result as the present invention. Consequently, the invention should not be interpreted as being limited to the specific configuration recited in the claims.

Benefits, other advantages and solutions mentioned herein are not to be construed as critical, required or essential features or components of any or all the claims.

As used herein, the terms "comprises", "comprising", or variations thereof, are intended to refer to a non-exclusive listing of elements, such that any apparatus, process, method, article, or composition of the invention that comprises a list of elements, that does not include only those elements recited, but may also include other elements such as those described in the instant specification. Unless otherwise explicitly stated, the use of the term "consisting" or "consisting of" or "consisting essentially of" is not intended to limit the scope of the invention to the enumerated elements named thereafter, unless otherwise indicated. Other combinations and/or modifications of the above-described elements, materials or structures used in the practice of the present invention may be varied or adapted by the skilled artisan to other designs without departing from the general principles of the invention.

The patents and articles mentioned above are hereby incorporated by reference herein, unless otherwise noted, to the extent that the same are not inconsistent with this disclosure.

The invention can be summarized by the following feature sets.

1. A system (100, 200, 300, 400, 500, 600, 700, 800, 1200, 1600, 1700, 1800, 1900, 2000, 2100) comprising at least one decorative element (102, 204, 302, 402, 502, 602, 702, 802, 1204, 1304, 1404, 1604, 2014, 2114) mechanically and moveably suspended in a fluid (116, 206, 326, 426, 510, 610, 726, 826, 1206, 1606, 1608, 1706, 1708, 1806, 1906, 2006, 2106) by mechanical fixation elements (104, 202, 304, 404, 506, 606, 704, 706, 804, 806, 1220, 1820, 1920, 2020, 2030, 2120, 2130), the fluid sharing a substantially similar refraction index as at least one of mechanical fixation elements.
2. The system of feature set 1, wherein the mechanical fixation elements (104, 202, 304, 404, 506, 606, 704, 706, 804, 806) are loose mechanical connections allowing a limited movement of the decorative elements (102, 204, 302, 402, 502, 602, 702, 802, 1204, 1304, 1404, 1604, 2014, 2114).
3. The system of feature set 1, wherein the mechanical fixation elements (104, 202, 304, 404, 506, 606, 704, 706, 804, 806) are at least one flexible membrane (1220, 1320, 1324, 1326, 1420, 1424, 1426, 1520, 1620, 1720, 1820, 1920) allowing a limited movement of the decorative elements (102, 204, 302, 402, 502, 602, 702, 802, 1204, 1304, 1404, 1604, 2014, 2114).
4. The system of feature set 3, wherein the decorative elements (102, 204, 302, 402, 502, 602, 702, 802, 1204, 1304, 1404, 1604, 2014, 2114) are parts of the flexible membrane (1220, 1320, 1324, 1326, 1420, 1424, 1426, 1520, 1620, 1720, 1820, 1920) covered with a metallization, crystals, diamonds or any other decorative element.
5. The system of feature set 3, wherein the decorative elements (102, 204, 302, 402, 502, 602, 702, 802, 1204, 1304, 1404, 1604, 2014, 2114) are one or more liquids or gels enclosed in the flexible membrane (1220, 1320, 1324, 1326, 1420, 1424, 1426, 1520, 1620, 1720, 1820, 1920).
6. The system of feature sets 2, 3, 4 or 5, wherein the at least one decorative element (102, 204, 302, 402, 502, 602, 702, 802, 1204, 1304, 1404, 1604, 2014, 2114) form at least one image.
7. The system of any of the preceeding feature sets, wherein a change of orientation of the system (100, 200, 300, 400, 500, 600, 700, 800, 1200, 1600, 1700, 1800, 1900, 2000, 2100) relative to gravity provokes a movement of the decorative elements (102, 204, 302, 402, 502, 602, 702, 802, 1204, 1304, 1404, 1604, 2014, 2114), animating the image.
8. The system of feature set 7, wherein at least one mobile element free to move in the surrounding fluid (116, 206, 326, 426, 510, 610, 726, 826, 1206, 1606, 1608, 1706, 1708, 1806, 1808, 1906, 2006, 2106) increases the movement of the at least one decorative element (102, 204, 302, 402, 502, 602, 702, 802, 1204, 1304, 1404, 1604, 2014, 2114) by colliding or resting temporarily on a part of the at least one decorative element (102, 204, 302, 402, 502, 602, 702, 802, 1204, 1304, 1404, 1604, 2014, 2114).
9. The system of feature set 8, wherein at least one of the at least one mobile elements share a substantially similar refraction index with the fluid (116, 206, 326, 426, 510, 610, 726, 826, 1206, 1606, 1608, 1706, 1708, 1806, 1808, 1906, 2006, 2106).

10. A method consisting of animating a decorative object, such as personal accessories, using the system of feature set 1.
11. The system(s) and/or method(s) as described in the instant specification, dependent claims, abstract (herein incorporated by reference), and/or drawing figures.

Other characteristics and modes of execution of the invention are described in the appended claims.

Materials used for the realization of the present invention are chosen to be suitable and in compliance to the operating temperature range of the invention. Such materials are e.g. metals, polymers or glass, and in particular sapphire glass. Equally for structures used for the realization of the present invention, such structures, as e.g. bellows, chips, or intrinsic membranes, are configured to be suitable and in compliance to the operating temperature range of the invention.

The system may include a thermal compensation system, the system comprising a mechanism accommodating thermal expansion and/or contraction of the liquid, avoiding the generation of unacceptably high pressure which could result in liquid leaking out of the system in case of temperature rise, or the generation of unattractive gas bubbles in the liquid in case of low temperature. Such thermal compensation may be made partially or completely invisible to the wearer. Such systems are disclosed in PCT Application No. PCT/IB2015/000448 of the same applicant, entitled SYSTEMS AND METHODS FOR ABSORPTION/EXPANSION/CONTRACTION/MOVEMENT OF A LIQUID IN A TRANSPARENT CAVITY, filed on the 7th of April, 2015, the contents of which are incorporated herein by reference thereto and relied upon.

Furthermore, the present invention may accommodate and employ a miniature, user-powered portable device for triggering the operation of an electric power consuming element, which is preferably wearable, employs mechanical energy storage and incorporates miniature special effect elements which are activated on-demand for a limited duration for backlighting, illumination, or other special effect purposes without the need for a battery or other electrochemical storage device. The device comprises a manual spring loading mechanism, a spiral spring, a manual trigger mechanism, a transmission for increasing the rotational speed, a miniature generator, and at least one electric power consuming element such as a transmitter or a light source, preferably a light emitting diode. Such a device are disclosed in PCT Application No. PCT/IB2016/000249 of the same applicant, entitled MINIATURE USER-POWERED LIGHTING DEVICE, SYSTEM AND METHOD OF USING SAME, filed on the 7$^{th}$ of March, 2016, the contents of which are incorporated herein by reference thereto and relied upon.

Further, the invention should be considered as comprising all possible combinations of every feature described in the instant specification, appended claims, and/or drawing figures that may be considered new, inventive and industrially applicable.

Copyright may be owned by the Applicant(s) or their assignee and, with respect to express Licensees to third parties of the rights defined in one or more claims herein, no implied license is granted herein to use the invention as defined in the remaining claims. Further, vis-à-vis the public or third parties, no express or implied license is granted to prepare derivative works based on this patent specification, inclusive of the appendix hereto and any computer program comprised therein.

Additional features and functionality of the invention are described in the claims appended hereto and/or in the abstract. Such claims and/or abstract are hereby incorporated in their entirety by reference thereto in this specification and should be considered as part of the application as filed.

Multiple variations and modifications are possible in the embodiments of the invention described here. Although certain illustrative embodiments of the invention have been shown and described here, a wide range of changes, modifications, and substitutions is contemplated in the foregoing disclosure. While the above description contains many specific details, these should not be construed as limitations on the scope of the invention, but rather exemplify one or another preferred embodiment thereof. In some instances, some features of the present invention may be employed without a corresponding use of the other features. Accordingly, it is appropriate that the foregoing description be construed broadly and understood as being illustrative only, the spirit and scope of the invention being limited only by the claims that ultimately issue in this application.

What is claimed is:

1. An article of jewelry comprising a chamber filled with a substantially transparent liquid into which chamber at least one decorative element assembly comprising a support holding at least one precious or semi-precious element is immersed, characterized in that the support has a refractive index which is substantially the same as the substantially transparent liquid so as to be substantially optically invisible therein.

2. The article of jewelry of claim 1, comprising at least two plates, at least one of which is a transparent plate, the two plates delimiting the chamber wherein inner faces of the at least two plates are preferably parallel to one another, and the at least one precious or semi-precious element and the support form a movable decorative element assembly immersed in the liquid.

3. The article of jewelry of claim 2, wherein said decorative element assembly further comprises an axis of revolution and two guide surfaces or geometric features adjacent to the inner faces of the at least two plates respectively which enable said movable decorative element assembly to move freely in translation and rotation in said substantially transparent liquid about said axis of revolution inside said chamber.

4. The article of jewelry according to claim 3, wherein said support is arranged to slow down movement of the movable decorative element assembly.

5. The article of jewelry according to claim 3, in which the at least one precious or semi-precious element is inserted on a decorative element assembly.

6. The article of jewelry according to claim 3, wherein the support is arranged to receive a plurality of precious or semi-precious elements.

7. The article of jewelry according to claim 3, in which the movable decorative element assembly is arranged to move in a channel.

8. The article of jewelry according to claim 2, wherein said support is arranged to slow down the movements of the movable decorative element assembly.

9. The Article of jewelry according to claim 2, in which the at least one precious or semi-precious element is inserted on at least one support.

10. The article of jewelry according to claim 9, wherein the at least one precious or semi-precious element have different densities and are arranged so as to orientate the movements of the support.

11. The article of jewelry according to claim 2, wherein the support is arranged to receive a plurality of precious or semi-precious elements.

12. The article of jewelry according to claim 2, in which the parallel inner faces of the at least two plates are flat.

13. The article of jewelry according to claim 2, in which the at least one transparent plate is made of polymers or glass, and in particular sapphire glass.

14. The article of jewelry according to claim 2, in which the movable decorative element assembly is arranged to move in a channel.

15. The article of jewelry according to claim 1, in which the movable decorative element assembly is arranged to move in a channel.

16. The article of jewelry according to claim 1, wherein the at least one precious or semi-precious element is a diamond.

17. The article of jewelry according to claim 1, in which the at least one precious or semi-precious element and the support have a corresponding shape, inter alia generally cylindrical, oval, square, triangular or asymmetrical shape.

18. The article of jewelry according to claim 1, wherein either or both of the at least two plates are made of a material with a refractive index similar to the refractive index of the surrounding substantially transparent liquid so as to be substantially invisible to a wearer.

19. The article of jewelry according to claim 1, wherein the supports are pillars or standoffs which act as supports which are part of the decorative element assemblies and which are made of a glass or transparent polymer material which matches the refractive index of the liquid in which they are submerged.

20. The article of jewelry according to claim 1, in the form of a wristwatch.

* * * * *